(12) United States Patent
Wang et al.

(10) Patent No.: US 11,666,415 B2
(45) Date of Patent: Jun. 6, 2023

(54) AUTOMATIC ALIGNER DESIGN WITH ROBUST PARAMETRIC OPTIMIZATION METHOD

(71) Applicant: Align Technology, Inc., San Jose, CA (US)

(72) Inventors: Yuxiang Wang, Newark, CA (US); Andrew Jang, San Mateo, CA (US); Bruce Cam, San Jose, CA (US); Rohit Tanugula, San Jose, CA (US); Chunhua Li, Cupertino, CA (US); Jun Sato, San Jose, CA (US); Luyao Cai, Santa Clara, CA (US); Pavel Pokotilov, Santa Clara, CA (US); Kangning Su, Arlington, VA (US); John Y. Morton, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 16/732,141

(22) Filed: Dec. 31, 2019

(65) Prior Publication Data
US 2020/0214801 A1    Jul. 9, 2020

Related U.S. Application Data

(60) Provisional application No. 62/788,043, filed on Jan. 3, 2019.

(51) Int. Cl.
*A61C 7/00* (2006.01)
*A61C 7/08* (2006.01)

(52) U.S. Cl.
CPC ............... *A61C 7/002* (2013.01); *A61C 7/08* (2013.01)

(58) Field of Classification Search
CPC .................................. A61C 7/002; A61C 7/08
USPC .............................................................. 703/2
See application file for complete search history.

(56) References Cited

U.S. PATENT DOCUMENTS

| | | | |
|---|---|---|---|
| 2,467,432 A | 4/1949 | Kesling | |
| 3,407,500 A | 10/1968 | Kesling | |
| 3,600,808 A | 8/1971 | Reeve et al. | |
| 3,660,900 A | 5/1972 | Andrews et al. | |
| 3,683,502 A | 8/1972 | Wallshein et al. | |
| 3,738,005 A | 6/1973 | Cohen et al. | |

(Continued)

FOREIGN PATENT DOCUMENTS

| | | | |
|---|---|---|---|
| AU | 3031677 A | 5/1979 | |
| AU | 5598894 A | 6/1994 | |

(Continued)

OTHER PUBLICATIONS

Barone, Sandro, Alessandro Paoli, Armando Viviano Razionale, and Roberto Savignano. "Computational design and engineering of polymeric orthodontic aligners." International journal for numerical methods in biomedical engineering 33, No. 8 (2017): e2839 (Year: 2017).*

(Continued)

*Primary Examiner* — John E Johansen
(74) *Attorney, Agent, or Firm* — Fortem IP LLP

(57) ABSTRACT

Methods and systems for producing orthodontic appliances are provided herein utilizing iterative modeling techniques to increase the efficiency and efficacy of said appliances. Further disclosed herein are the orthodontic appliances fabricated from such methods.

22 Claims, 18 Drawing Sheets

(56) References Cited

U.S. PATENT DOCUMENTS

| | | |
|---|---|---|
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 4,014,096 A | 3/1977 | Dellinger |
| 4,195,046 A | 3/1980 | Kesling et al. |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,478,580 A | 10/1984 | Barrut et al. |
| 4,500,294 A | 2/1985 | Lewis et al. |
| 4,504,225 A | 3/1985 | Yoshii |
| 4,505,673 A | 3/1985 | Yoshii et al. |
| 4,526,540 A | 7/1985 | Dellinger et al. |
| 4,575,330 A | 3/1986 | Hull et al. |
| 4,575,805 A | 3/1986 | Moermann et al. |
| 4,591,341 A | 5/1986 | Andrews et al. |
| 4,609,349 A | 9/1986 | Cain et al. |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling et al. |
| 4,676,747 A | 6/1987 | Kesling et al. |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz et al. |
| 4,798,534 A | 1/1989 | Breads et al. |
| 4,836,778 A | 6/1989 | Baumrind et al. |
| 4,837,732 A | 6/1989 | Brandestini et al. |
| 4,850,864 A | 7/1989 | Diamond et al. |
| 4,850,865 A | 7/1989 | Napolitano et al. |
| 4,856,991 A | 8/1989 | Breads et al. |
| 4,877,398 A | 10/1989 | Kesling et al. |
| 4,880,380 A | 11/1989 | Martz et al. |
| 4,889,238 A | 12/1989 | Batchelor et al. |
| 4,890,608 A | 1/1990 | Steer et al. |
| 4,935,635 A | 6/1990 | O'Harra et al. |
| 4,936,862 A | 6/1990 | Walker et al. |
| 4,937,928 A | 7/1990 | Van Der Zel et al. |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell et al. |
| 5,011,405 A | 4/1991 | Lemchen |
| 5,017,133 A | 5/1991 | Miura et al. |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman et al. |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax et al. |
| 5,184,306 A | 2/1993 | Erdman et al. |
| 5,186,623 A | 2/1993 | Breads et al. |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson et al. |
| 5,342,202 A | 8/1994 | Deshayes et al. |
| 5,368,478 A | 11/1994 | Andreiko et al. |
| 5,382,164 A | 1/1995 | Stern et al. |
| 5,395,238 A | 3/1995 | Andreiko et al. |
| 5,431,562 A | 7/1995 | Andreiko et al. |
| 5,440,326 A | 8/1995 | Quinn et al. |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern et al. |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. et al. |
| 5,621,648 A | 4/1997 | Crump et al. |
| 5,645,420 A | 7/1997 | Bergersen et al. |
| 5,645,421 A | 7/1997 | Slootsky et al. |
| 5,655,653 A | 8/1997 | Chester et al. |
| 5,683,243 A | 11/1997 | Andreiko et al. |
| 5,692,894 A | 12/1997 | Schwartz et al. |
| 5,725,376 A | 3/1998 | Poirier et al. |
| 5,725,378 A | 3/1998 | Wang et al. |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson et al. |
| 5,823,778 A | 10/1998 | Schmitt et al. |
| 5,848,115 A | 12/1998 | Little et al. |
| 5,857,853 A | 1/1999 | Van Nifterick et al. |
| 5,866,058 A | 2/1999 | Batchelder et al. |
| 5,879,158 A | 3/1999 | Doyle et al. |
| 5,880,961 A | 3/1999 | Crump et al. |
| 5,880,962 A | 3/1999 | Andersson et al. |
| 5,934,288 A | 8/1999 | Avila et al. |
| 5,957,686 A | 9/1999 | Anthony et al. |
| 5,964,587 A | 10/1999 | Sato et al. |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda et al. |
| 6,049,743 A | 4/2000 | Baba et al. |
| 6,062,861 A | 5/2000 | Andersson |
| 6,068,482 A | 5/2000 | Snow et al. |
| 6,099,314 A | 8/2000 | Kopelman et al. |
| 6,123,544 A | 9/2000 | Cleary |
| 6,152,731 A | 11/2000 | Jordan et al. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren et al. |
| 6,244,861 B1 | 6/2001 | Andreiko et al. |
| 6,309,215 B1 | 10/2001 | Phan et al. |
| 6,315,553 B1 | 11/2001 | Sachdeva et al. |
| 6,322,359 B1 | 11/2001 | Jordan et al. |
| 6,350,120 B1 | 2/2002 | Sachdeva et al. |
| 6,382,975 B1 | 5/2002 | Poirier et al. |
| 6,398,548 B1 | 6/2002 | Muhammad et al. |
| 6,402,707 B1 | 6/2002 | Ernst et al. |
| 6,450,807 B1 | 9/2002 | Chishti et al. |
| 6,482,298 B1 | 11/2002 | Bhatnagar et al. |
| 6,524,101 B1 | 2/2003 | Phan et al. |
| 6,554,611 B2 | 4/2003 | Shishti et al. |
| 6,572,372 B1 | 6/2003 | Phan et al. |
| 6,629,840 B2 | 10/2003 | Chishti et al. |
| 6,705,863 B2 | 3/2004 | Phan et al. |
| 6,722,880 B2 | 4/2004 | Chishti et al. |
| 6,830,450 B2 | 12/2004 | Knopp et al. |
| 7,831,322 B2 * | 11/2010 | Liu .................. A61B 8/0089 700/95 |
| 8,765,031 B2 * | 7/2014 | Li .................. B29C 45/0001 264/16 |
| 9,655,693 B2 | 5/2017 | Li et al. |
| 10,717,208 B1 * | 7/2020 | Raslambekov ........ A61C 7/002 |
| 2002/0006597 A1 | 1/2002 | Andreiko et al. |

(56) References Cited

U.S. PATENT DOCUMENTS

| | | | |
|---|---|---|---|
| 2002/0064748 A1* | 5/2002 | Chishti | G06F 30/20 433/24 |
| 2003/0009252 A1 | 1/2003 | Pavlovskaia et al. | |
| 2003/0139834 A1 | 7/2003 | Nikolskiy et al. | |
| 2003/0224311 A1 | 12/2003 | Cronauer et al. | |
| 2004/0128010 A1 | 7/2004 | Pavlovskaia et al. | |
| 2005/0055118 A1 | 3/2005 | Nikolskiy et al. | |
| 2008/0254402 A1* | 10/2008 | Hilliard | G05B 19/4097 433/24 |
| 2009/0191502 A1* | 7/2009 | Cao | A61C 7/08 433/24 |
| 2009/0191503 A1* | 7/2009 | Matov | A61C 7/002 433/2 |
| 2010/0129762 A1* | 5/2010 | Mason | A61C 7/002 433/6 |
| 2010/0138025 A1* | 6/2010 | Morton | G06F 17/10 700/104 |
| 2013/0204583 A1* | 8/2013 | Matov | A61C 7/002 703/1 |
| 2016/0310236 A1* | 10/2016 | Kopelman | G06F 30/00 |
| 2017/0007359 A1 | 1/2017 | Kopelman et al. | |
| 2017/0007368 A1* | 1/2017 | Boronkay | A61C 7/002 |
| 2017/0100209 A1* | 4/2017 | Wen | A61C 7/08 |
| 2017/0367792 A1* | 12/2017 | Raby | A61C 7/002 |
| 2018/0263733 A1 | 9/2018 | Pokotilov et al. | |
| 2019/0105842 A1* | 4/2019 | Dau | B33Y 80/00 |
| 2019/0338067 A1 | 11/2019 | Liska et al. | |
| 2020/0100871 A1* | 4/2020 | Wang | A61C 7/002 |
| 2020/0214800 A1* | 7/2020 | Matov | G16H 20/00 |

FOREIGN PATENT DOCUMENTS

| | | |
|---|---|---|
| CA | 1121955 A | 4/1982 |
| CN | 107847299 A | 3/2018 |
| DE | 2749802 A1 | 5/1978 |
| DE | 69327661 T2 | 7/2000 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 1/2000 |
| EP | 0774933 B1 | 12/2000 |
| EP | 0731673 B1 | 5/2001 |
| ES | 463897 A1 | 1/1980 |
| FR | 2369828 A1 | 6/1978 |
| FR | 2652256 A1 | 3/1991 |
| GB | 1550777 A | 8/1979 |
| JP | S5358191 A | 5/1978 |
| JP | H0428359 A | 1/1992 |
| JP | H08508174 A | 9/1996 |
| WO | WO-9008512 A1 | 8/1990 |
| WO | WO-9104713 A1 | 4/1991 |
| WO | WO-9410935 A1 | 5/1994 |
| WO | WO-9832394 A1 | 7/1998 |
| WO | WO-9844865 A1 | 10/1998 |
| WO | WO-9858596 A1 | 12/1998 |
| WO | WO-2010059988 A1 | 5/2010 |
| WO | WO-2017007962 A1 | 1/2017 |
| WO | WO-2017007964 A1 | 1/2017 |
| WO | WO-2019213588 A1 | 11/2019 |
| WO | WO-2020142534 A1 | 7/2020 |

OTHER PUBLICATIONS

Barone, Sandro, Alessandro Paoli, Armando Viviano Razionale, and Roberto Savignano. "Modelling Strategies for the Advanced Design of Polymeric Orthodontic Aligners." In International Joint Conference on Biomedical Engineering Systems and Technologies, pp. 67-83. Springer, Cham, 2016 (Year: 2016).*

Barone, Sandro, Alessandro Paoli, Armando Viviano Razionale, and Roberto Savignano. "Design of Customised Orthodontic Devices by Digital Imaging and CAD/FEM Modelling." In Bioimaging, pp. 44-52. 2016 (Year: 2016).*

Elkholy, Fayez, Falko Schmidt, Rudolf Jäger, and Bernd G. Lapatki. "Forces and moments applied during derotation of a maxillary central incisor with thinner aligners: an in-vitro study." American Journal of Orthodontics and Dentofacial Orthopedics 151, No. 2 (2017): 407-415 (Year: 2017).*

Hahn et al. "Influence of thermoplastic appliance thickness on the magnitude of force delivered to a maxillary central incisor during tipping." American Journal of Orthodontics and Dentofacial Orthopedics 136, No. 1 (2009): pp. 12-e1 to 12-e7 (Year: 2009 ).*

Kim, Tae-Weon, and Pablo Echarrri. "Clear aligner: an efficient, esthetic, and comfortable option for an adult patient." World journal of orthodontics 8, No. 1 (2007), pp. 13-18 (Year: 2007).*

Tiantong Lou and Anthony Mair, An Historical Overview of Clear Aligner Therapy The Evolution of Clear Aligners, obtained from https://www.oralhealthgroup.com/features/an-historical-overview-of-clear-aligner-therapy-the-evolution-of-clear-aligners/on Mar. 19, 2021, 2020, 10 pages (Year: 2020).*

Savignano, Roberto. "Biomechanical analysis of orthodontic appliances through 3D Computer Aided Engineering." In Doctoral Consortium on Biomedical Engineering Systems and Technologies, vol. 2, pp. 28-35. Scitepress, 2014 (Year: 2014).*

PCT/US2019/069131 International Search Report and Written Opinion dated Jun. 23, 2020.

AADR. American Association for Dental Research, Summary of Activities, Mar. 20-23, 1980, Los Angeles, CA, p. 195.

Alcaniz, et al., "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.

Alexander et al., "The DigiGraph Work Station Part 2 Clinical Management," JCO, pp. 402-407 (Jul. 1990).

Altschuler, "3D Mapping of Maxillo-Facial Prosthesis," AADR Abstract #607, 2 pages total, (1980).

Altschuler et al., "Analysis of 3-D Data for Comparative 3-D Serial Growth Pattern Studies of Oral-Facial Structures," IADR Abstracts, Program and Abstracts of Papers, 57th General Session, IADR Annual Session, Mar. 29, 1979-Apr. 1, 1979, New Orleans Marriot, Journal of Dental Research, vol. 58, Jan. 1979, Special Issue A, p. 221.

Altschuler et al., "Laser Electro-Optic System for Rapid Three-Dimensional (3D) Topographic Mapping of Surfaces," Optical Engineering, 20(6):953-961 (1981).

Altschuler et al., "Measuring Surfaces Space-Coded by a Laser-Projected Dot Matrix," SPIE Imaging Applications for Automated Industrial Inspection and Assembly, vol. 182, p. 187-191 (1979).

Andersson et al., "Clinical Results with Titanium Crowns Fabricated with Machine Duplication and Spark Erosion," Acta. Odontol. Scand., 47:279-286 (1989).

Andrews, The Six Keys to Optimal Occlusion Straight Wire, Chapter 3, pp. 13-24 (1989).

Bartels, et al., An Introduction to Splines for Use in Computer Graphics and Geometric Modeling, Morgan Kaufmann Publishers, pp. 422-425 (1987).

Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.

Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.

Baumrind et al., "Mapping the Skull in 3-D," reprinted from J. Calif. Dent. Assoc., 48(2), 11 pages total, (1972 Fall Issue).

Baumrind, "Integrated Three-Dimensional Craniofacial Mapping: Background, Principles, and Perspectives," Semin. in Orthod., 7(4):223-232 (Dec. 2001).

Begole et al., "A Computer System for the Analysis of Dental Casts," The Angle Orthod., 51(3):253-259 (Jul. 1981).

(56) References Cited

OTHER PUBLICATIONS

Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237-253 (1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Biostar Opeation & Training Manual. Great Lakes Orthodontics, Ltd. 199 Fire Tower Drive, Tonawanda, New York. 14150-5890, 20 pages total (1990).
Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL< http://astronomy.swin.edu.au/-pbourke/prolection/coords>.
Boyd et al., "Three Dimensional Diagnosis and Orthodontic Treatment of Complex Malocclusions With the Invisalign Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Burstone (interview), "Dr. Charles J. Burstone on The Uses of the Computer in Orthodontic Practice (Part 1)," J. Clin. Orthod., 13(7):442-453 (Jul. 1979).
Burstone (interview), "Dr. Charles J. Burstone on The Uses of the Computer in Orthodontic Practice (Part 2)," J. Clin. Orthod., 13(8):539-551 (Aug. 1979).
Cardinal Industrial Finishes, Powder Coatings information posted at<http://www.cardinalpaint.com> on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside," Part 2 F. Duret—A Man with a Vision, "Part 3 The Computer Gives New Vision—Literally," Part 4 Bytes 'N Bites—The Computer Moves from the Front Desk to the Operatory, Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).

Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992).
Definition for gingiva. Dictionary.com p. 1-3. Retrieved from the internet Nov. 5, 2004<http//reference.com/search/search?q=gingiva>.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
DENT-X posted on Sep. 24, 1998 at<http://www.dent-x.com/DentSim.htm>, 6 pages.
Doyle, "Digital Dentistry," Computer Graphics World, pp. 50-52, 54 (Oct. 2000).
DuraClearTM product information, Allesee Orthodontic Appliances—Pro Lab, 1 page (1997).
Duret et al., "CAD/CAM Imaging in Dentistry," Curr. Opin. Dent., 1:150-154 (1991).
Duret et al., "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et al., "Automated Finite Element Modeling of a Human Mandible with Dental Implants," JS WSCG '98—Conference Program, retrieved from the Internet:<http://wscg.zcu.cz/wscg98/papers98/Strasser 98.pdf, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
Gottleib et al., "JCO Interviews Dr. James A. McNamura, Jr., on the Frankel Appliance: Part 2: Clinical 1-1 Management, "J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxillofacial Surgery," AAOMS, 3 pages total, (Sep. 13, 1990).
Guess et al., "Computer Treatment Estimates In Orthodontics and Orthognathic Surgery," JCO, pp. 262-28 (Apr. 1989).
Heaven et al., "Computer-Based Image Analysis of Artificial Root Surface Caries," Abstracts of Papers, J. Dent. Res., 70:528 (Apr. 17-21, 1991).
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).
Hoffmann, et al., "Role of Cephalometry for Planning of Jaw Orthopedics and Jaw Surgery Procedures," (Article Summary in English, article in German), Informationen, pp. 375-396 (Mar. 1991).
Hojjatie et al., "Three-Dimensional Finite Element Analysis of Glass-Ceramic Dental Crowns," J. Biomech., 23(11):1157-1166 (1990).

(56) References Cited

OTHER PUBLICATIONS

Huckins, "CAD-CAM Generated Mandibular Model Prototype from MRI Data," AAOMS, p. 96 (1999).
Important Tip About Wearing the Red White & Blue Active Clear Retainer System. Allesee Orthodontic Appliances—Pro Lab. 1 page (1998).
JCO Interviews, "Craig Andreiko , DDS, MS on the Elan and Orthos Systems," JCO, pp. 459-468 (Aug. 1994).
JCO Interviews, "Dr. Homer W. Phillips on Computers in Orthodontic Practice, Part 2," JCO. 1997; 1983:819-831.
Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
JP Faber et al., "Computerized Interactive Orthodontic Treatment Planning," Am. J. Orthod., 73(1):36-46 (Jan. 1978).
Kamada et.al., Case Reports On Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).
Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984). KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991.
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
McCann, "Inside the ADA," J. Amer. Dent. Assoc., 118:286-294 (Mar. 1989).
McNamara et al., "Invisible Retainers," J. Clin. Orthod., pp. 570-578 (Aug. 1985).
McNamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy As One, Two, Three," AOA/Pro Corner, vol. 11, No. 1, 2 pages (2002).
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, (Oct. 22-23, 1990).
Nishiyama et al., "A New Construction of Tooth Repositioner by LTV Vinyl Silicone Rubber," J. Nihon Univ. Sch. Dent., 19(2):93-102 (1977).

Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
Procera Research Projects, "Procera Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993.
Raintree Essix & ARS Materials, Inc., Raintree Essix, Technical Magazine Table of contents and Essix Appliances,< http://www.essix.com/magazine/defaulthtml> Aug. 13, 1997.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording The Dental Cast In Three Dimensions," Am. J. Orthod. Dentofacial Orthop., 92(3):199-206 (Sep. 1987).
Rudge, "Dental Arch Analysis: Arch Form, A Review of the Literature," Eur. J. Orthod., 3(4):279-284 1981.
Sakuda et al., "Integrated Information-Processing System In Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolaryngol Head Neck Surg., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Sinclair, "The Readers' Corner," J. Clin. Orthod., 26(6):369-372 (Jun. 1992).
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.

(56) References Cited

OTHER PUBLICATIONS

The Choice Is Clear: Red, White & Blue . . . The Simple, Affordable, No-Braces Treatment, Allesee Orthodontic Appliances-Pro Lab product information, 6 pages (2003).
The Choice Is Clear: Red, White & Blue . . . The Simple, Affordable, No-Braces Treatment, Allesee HI Orthodontic Appliances—Pro Lab product information for doctors. http://ormco.com/aoa/appliancesservices/RWB/doctorhtml, 5 pages (May 19, 2003).
The Choice is Clear: Red, White & Blue . . . The Simple, Affordable, No-Braces Treatment, Allesee HJ Orthodontic Appliances-Pro Lab product information for patients, (http://ormco.com/aoa/appliancesservices/RWB/patients.html), 2 pages (May 19, 2003).
The Red, White & Blue Way to Improve Your Smile!, Allesee Orthodontic Appliances—Pro Lab product information for patients, 2 pages (1992).
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11):769-778 (1993.
Varady et al., "Reverse Engineering Of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 388-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987).
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL(http://wscg.zcu.cz/wscg98/wscg98.h).
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
You May Be A Candidate For This Invisible No-Braces Treatment, Allesee Orthodontic Appliances—Pro Lab product information for patients, 2 pages (2002).
Gim-Alldent Deutschland, "Das DUX System: Die Technik," (with Certified English Translation), 5 pages total (2002).
Mormann et al., "Marginale Adaptation von adhasuven Porzellaninlays in vitro," (with Certified English Translation), Separatdruck aus: Schweiz. Mschr. Zahnmed. 95: 1118-1129, 1985, (total of 24 pages).
Siemens, "CEREC—Computer-Reconstruction," (with Certified English Translation), High Tech in derZahnmedizin, 29 pages total (2004).
Simulating Stress Put on Jaws. Tooling & Production. ISSN: 0040-9243. 2 pages total. Nov. 1, 1996 (Accessed on Oct. 13, 2020).
Sirona Dental Systems GmbH, CEREC 3D, Manuel utilisateur, Version 2.0X (in French with Certified English Translation), 2003, 229 pages total.

\* cited by examiner

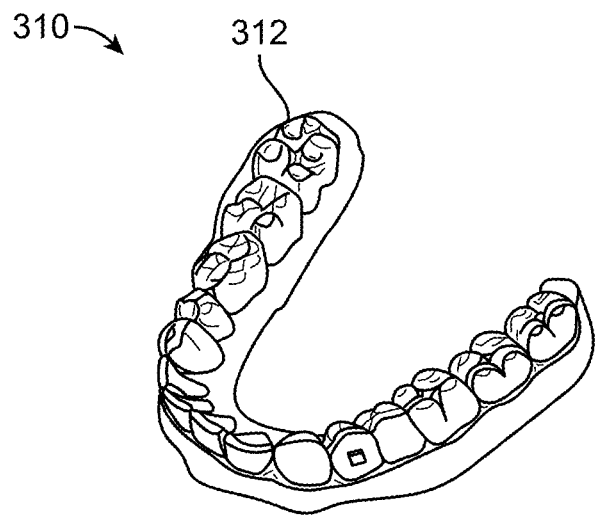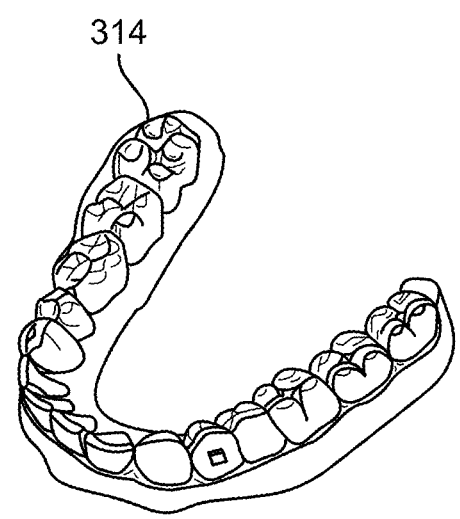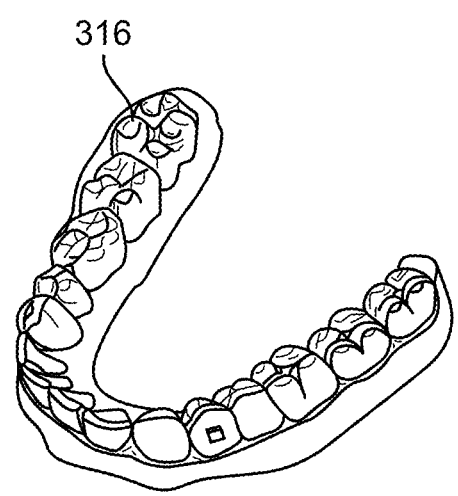
FIG. 3B

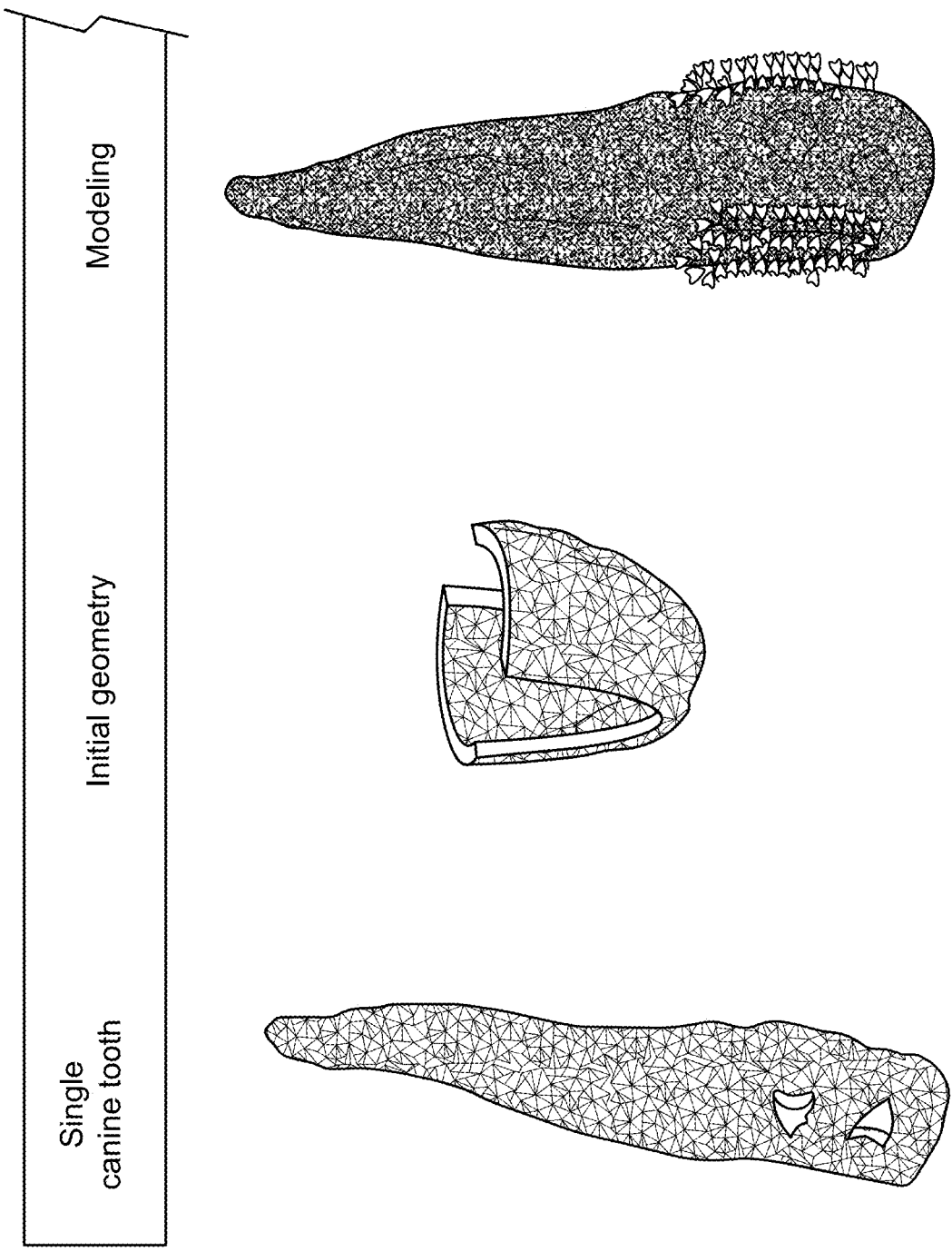

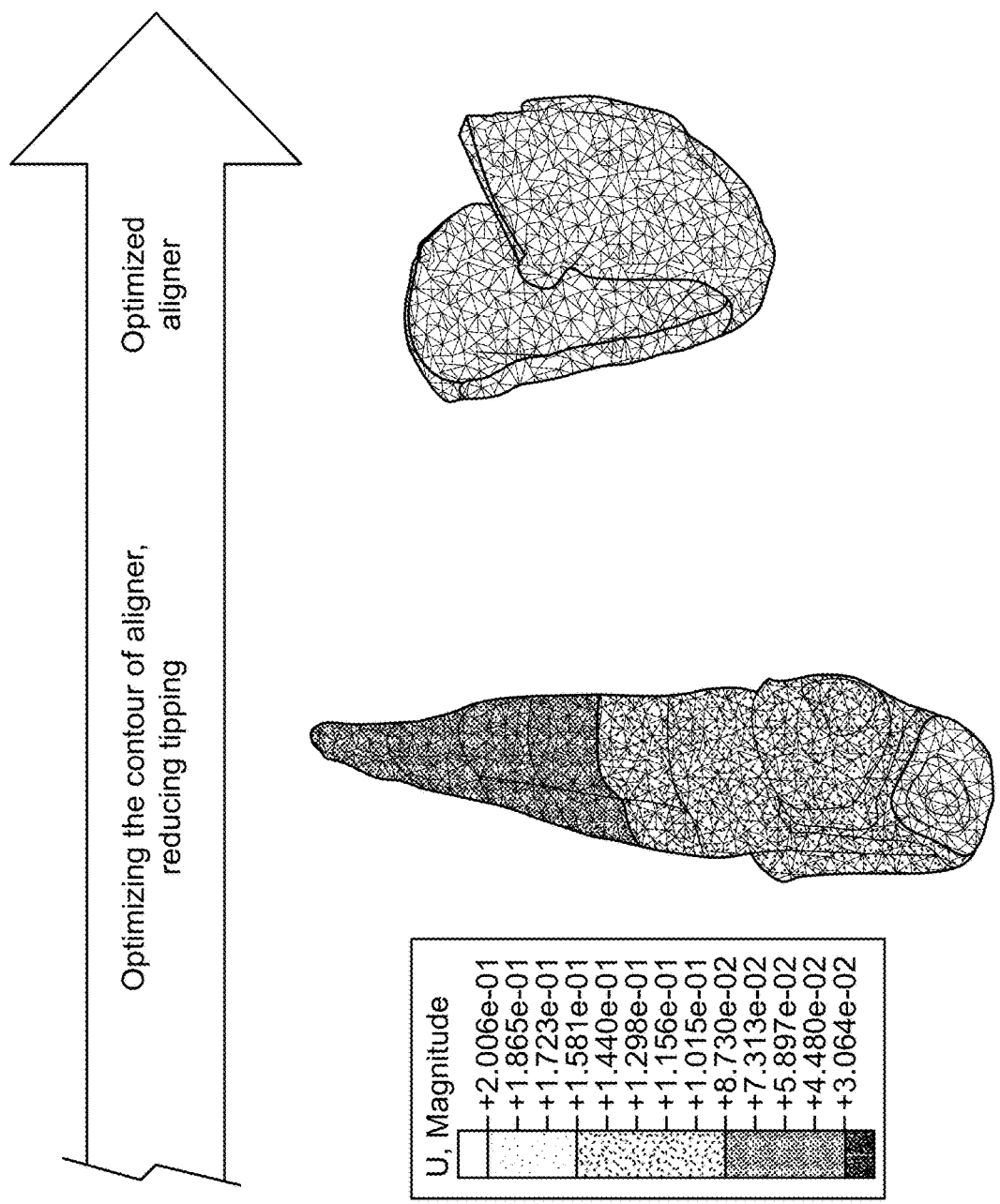

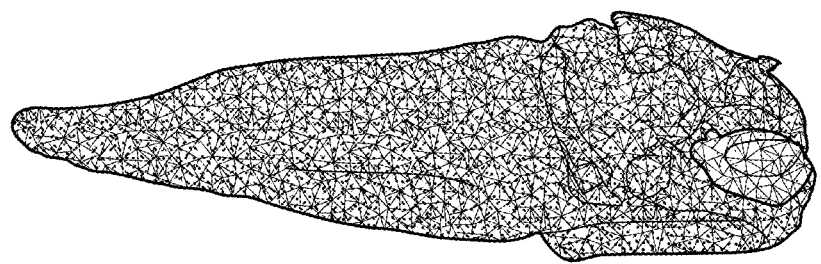
FIG. 9C
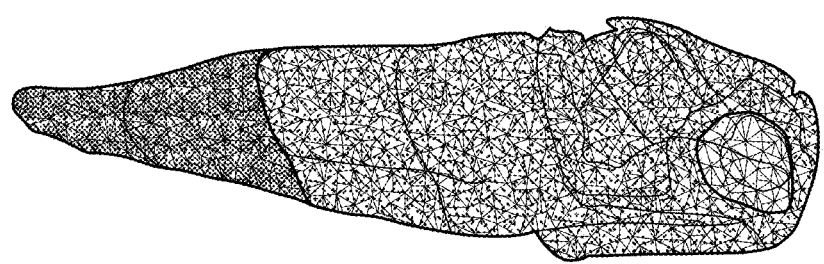
FIG. 9B
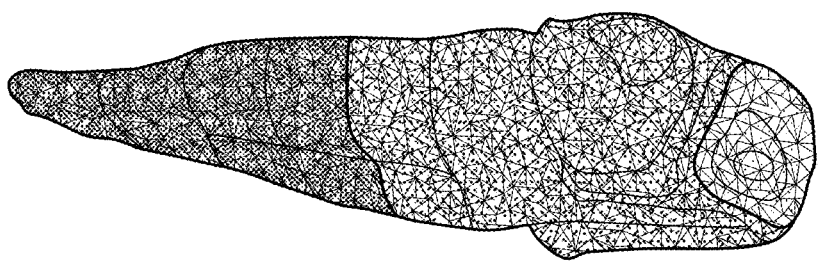
FIG. 9A
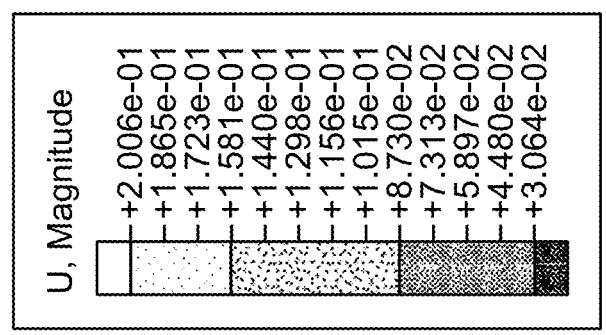

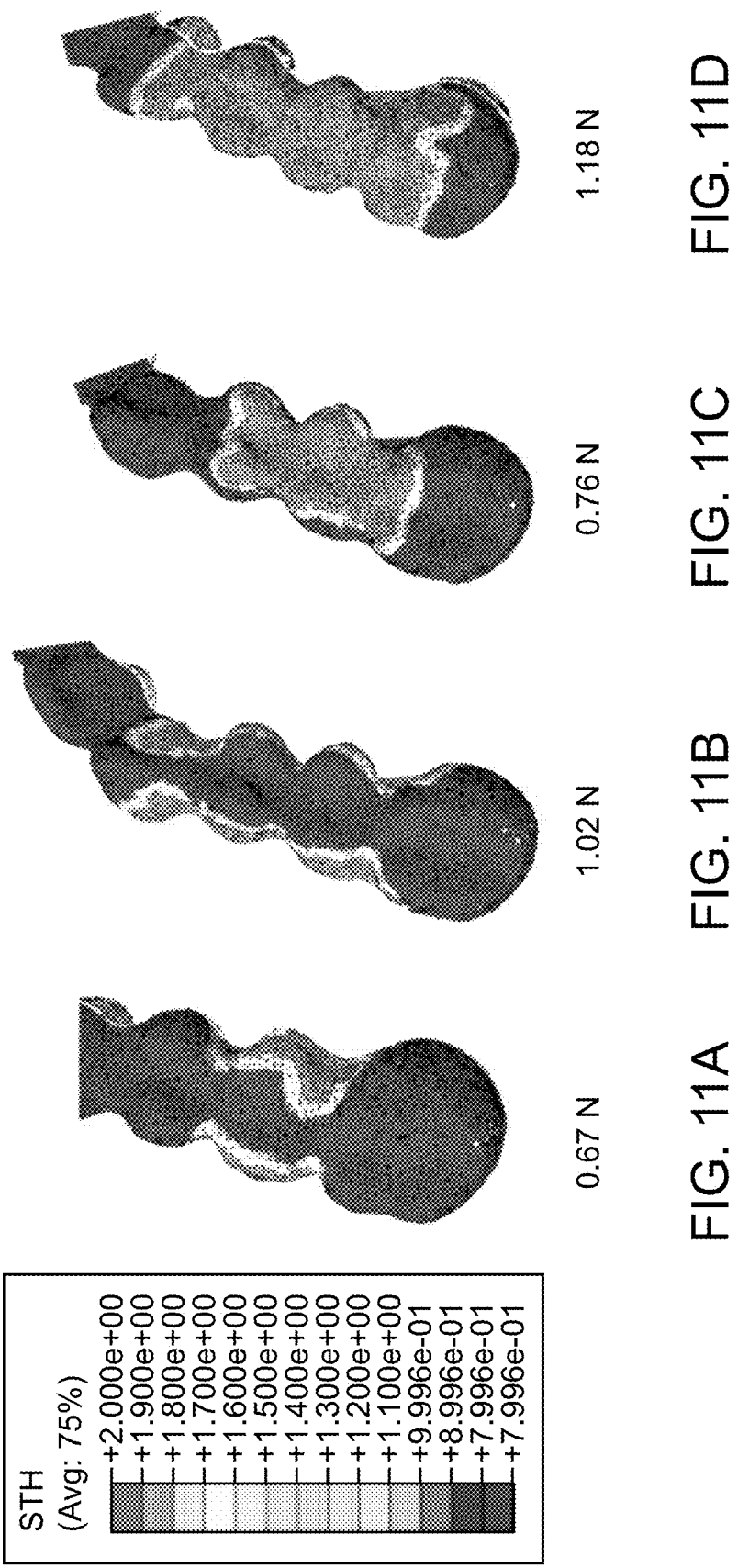

AUTOMATIC ALIGNER DESIGN WITH ROBUST PARAMETRIC OPTIMIZATION METHOD

CROSS REFERENCE

This application claims benefit of U.S. Provisional Application No. 62/788,043, filed Jan. 3, 2019, the entire contents of which are incorporated by reference.

TECHNICAL FIELD

The technical field relates to design of dental appliances, and more particularly to design of dental appliances by optimizing physical properties of dental appliances in light of the requirements of treatment plans that prescribe the dental appliances.

BACKGROUND

Orthodontic treatment often includes addressing issues with malposition teeth and may include diagnosis, prevention, and/or correction of malocclusions. Many forms of orthodontic treatment include an initial consultation and diagnosis of malpositioning by a dental professional (e.g., an orthodontist, such as a professional who has undergone special training after graduating from dental school, or a dentist), a treatment plan, and use of dental appliances (such as braces, brackets, wires, etc.) to implement the treatment plan. Some forms of orthodontic treatment include application of a set of removable dental appliances to gradually reposition a patient's teeth from an initial position to a final position through a set of intermediate arrangements. The treatment plan underlying orthodontic treatment may be generated after an initial consultation or at other times, and in many cases (particularly those involving braces, wires, and brackets), is changed at various times at check-ups and/or through the course of treatment.

Though convenient, systems of removable appliances may not implement treatment plans as efficiently as they could. In many instances, the thicknesses or physical geometries of appliances may implement forces that move teeth past an intended position or not quite to an intended position prescribed by a stage of a treatment plan. Additionally, the physical properties of appliances may be prone to stress or strain at different regions and may therefore be limited in the types of forces they are able to implement. Systems using removable appliances of uniform thickness may be too thick or too thin in some places, and may therefore cause discomfort and/or be unduly limited in the types of forces they are able to implement. While it would be desirable to personalize aligners for patients and/or their treatment plans, existing systems make it difficult to do so.

SUMMARY

A method of determining the geometry of an orthodontic appliance is disclosed. The method may include providing a treatment plan, the treatment plan comprising: an initial position of a patient's teeth, a final position of the patient's teeth, a plurality of stages to move the patient's teeth from the initial position towards the final position, and a treatment force for each of the plurality of stages to move the patient's teeth. The method may also include generating an initial 3D model of an aligner, the initial 3D model comprising a plurality of tooth-receiving cavities to receive the patient's teeth being positioned to produce the treatment force, producing a finite element shell model comprising a plurality of shell elements according to the initial 3D model, determining a first modeled force based on the finite element shell model, varying at least one shell element of the finite element shell model, thereby generating at least one intermediate 3D model, the intermediate 3D model comprising a second modeled force to move the patient's teeth toward the final position, comparing at least one of the first modeled force and the second modeled force with the treatment force to provide a similarity value, and repeating the varying until a threshold shell element value, a threshold similarity value, or a combination thereof is obtained.

In some embodiments, varying at least one shell element of the 3D model comprises using a topological algorithm to vary a discrete element density map. The varying at least one shell element of the 3D model may include using a sizing algorithm to vary a discrete thickness map.

The varying at least one shell element of the 3D model comprises using a parametric algorithm to vary a parametric thickness map. The similarity value may compare the first modeled force, the second modeled force, or any combination thereof to the treatment force, and wherein the similarity value is greater than 50%.

The method may also include the step of generating instructions for the fabrication of the orthodontic appliance. The method may also include the step of fabricating the orthodontic appliance.

A method of determining the geometry of an orthodontic appliance is also disclosed. The method may include providing a treatment plan including an initial position of a patient's teeth, a final position of the patient's teeth, a plurality of stages to move the patient's teeth from the initial position towards the final position, and a treatment force for each of the plurality of stages to move the patient's teeth. The method may also include generating an initial 3D model of an aligner, the initial 3D model comprising a plurality of tooth-receiving cavities to receive the patient's teeth being positioned to produce the treatment force, producing a finite element shell model comprising a plurality of shell elements according to the initial 3D model, determining a first modeled force based on the finite element shell model, varying at least one shell element of the finite element shell model, thereby generating a first intermediate 3D model, the first intermediate 3D model comprising a second modeled force to move the patient's teeth toward the final position, varying at least one shell element of the first intermediate 3D model, thereby generating a second intermediate 3D model, the second intermediate 3D model comprising a third modeled force to move the patient's teeth toward the final position, comparing at least one of the first modeled force, the second modeled force and the third modeled force with the treatment force to provide a similarity value, and repeating the varying until a threshold shell element value, a threshold similarity value, or a combination thereof is obtained.

In some embodiments, the varying at least one shell element of the 3D model includes using a topological algorithm to vary a discrete element density map. In some embodiments, the varying at least one shell element of the 3D model includes using a sizing algorithm to vary a discrete thickness map. In some embodiments, the varying at least one shell element of the 3D model includes using a parametric algorithm to vary a parametric thickness map.

In some embodiments, the similarity value compares the first modeled force, the second modeled force, the third modeled force, or any combination thereof to the treatment force, and wherein the similarity value is greater than 50%.

In some embodiments, the method may also include the step of generating instructions for the fabrication of the orthodontic appliance. In some embodiments, the method may also include the step of fabricating the orthodontic appliance.

An orthodontic appliance constructed using the methods herein is disclosed.

The orthodontic appliance may have no more than 90% of the amount of material used in a comparable traditional orthodontic appliance having the treatment force.

The orthodontic appliance may be one of a plurality of orthodontic appliances.

A method for designing a dental appliance is also disclosed. The method may include identifying an intended outcome of at least a portion of a dentition of a patient at an end of at least one stage of a treatment plan, wherein the treatment plan comprises a plan to treat the at least the portion of the dentition, identifying one or more forces implemented on the at least the portion of the dentition during the at least one stage of the treatment plan, identifying one or more clinical acceptability criteria for the at least one stage, the one or more clinical acceptability criteria providing criteria to evaluate compliance with the intended outcome, gathering an aligner model for the at least one stage, wherein the aligner model comprises a model of an aligner for the at least the portion of the dentition at a beginning of the at least one stage and the aligner model has a thickness parameter to represent a thickness of at least a portion of the aligner model, iteratively modeling application of the one or more forces to the at least the portion of the dentition at the beginning of the at least one stage using the aligner model with the thickness parameter at iteratively reduced thicknesses until a resulting thickness is found for the thickness parameter, the resulting thickness being less than or equal to a starting thickness, and the resulting thickness being associated with a satisfactory outcome of the at least the portion of the dentition at the end of the at least one stage, the satisfactory outcome satisfying the one or more clinical acceptability criteria, and providing instructions to manufacture the dental appliance using the aligner model with the resulting thickness assigned to the thickness parameter.

Iteratively modeling application of the one or more forces to the at least the portion of the dentition at the beginning of the at least one stage may include assigning the starting thickness to the thickness parameter, determining whether application of the one or more forces to the at least the portion of the dentition at the beginning of the at least one stage satisfies the one or more clinical acceptability criteria, and if the application of the one or more forces to the at least the portion of the dentition at the beginning of the at least one stage with the aligner model having the starting thickness assigned to the thickness parameter satisfies the one or more clinical acceptability criteria, using the starting thickness as the resulting thickness.

Iteratively modeling application of the one or more forces to the at least the portion of the dentition at the beginning of the at least one stage may include assigning the starting thickness to the thickness parameter, determining whether application of the one or more forces to the at least the portion of the dentition at the beginning of the at least one stage satisfies the one or more clinical acceptability criteria, and if the application of the one or more forces to the at least the portion of the dentition at the beginning of the at least one stage with the aligner model having the starting thickness assigned to the thickness parameter does not satisfy the one or more clinical acceptability criteria: assigning one or more intermediate thicknesses to the thickness parameter, the one or more intermediate thicknesses being less than the starting thickness, iteratively determining whether application of the one or more forces to the at least the portion of the dentition at the beginning of the at least one stage with the aligner model having one or more intermediate thicknesses assigned to the thickness parameter satisfy the one or more clinical acceptability criteria.

In some embodiments, if the application of the one or more forces to the at least the portion of the dentition at the beginning of the at least one stage with the aligner model having one of the one or more intermediate thicknesses assigned to the thickness parameter satisfies the one or more clinical acceptability criteria, using the one of the one or more intermediate thicknesses as the resulting thickness.

The method may also include using one of the one or more intermediate thicknesses as the resulting thickness.

Iteratively modeling application of the one or more forces to the at least the portion of the dentition at the beginning of the at least one stage may include identifying a maximum number of modeling operations, assigning the starting thickness to the thickness parameter, determining whether application of the one or more forces to the at least the portion of the dentition at the beginning of the at least one stage satisfies the one or more clinical acceptability criteria. In some embodiments, if the application of the one or more forces to the at least the portion of the dentition at the beginning of the at least one stage with the aligner model having the starting thickness assigned to the thickness parameter does not satisfy the one or more clinical acceptability criteria: assigning one or more intermediate thicknesses to the thickness parameter, the one or more intermediate thicknesses being less than the starting thickness, iteratively determining whether application of the one or more forces to the at least the portion of the dentition at the beginning of the at least one stage with the aligner model having one or more intermediate thicknesses assigned to the thickness parameter satisfy the one or more clinical acceptability criteria, if the application of the one or more forces to the at least the portion of the dentition at the beginning of the at least one stage with the aligner model having the one or more intermediate thicknesses assigned to the thickness parameter does not satisfy the one or more clinical acceptability criteria: identifying a closest intermediate thickness of the one or more intermediate thicknesses, the aligner model with closest intermediate thickness being closer to satisfying the one or more clinical acceptability criteria than aligner models having the starting thickness or any of the one or more intermediate thicknesses other than the closest intermediate thickness, and using the closest intermediate thickness as the resulting thickness.

In some embodiments, the method may include gathering the treatment plan and identifying the at least one stage of the treatment plan. In some embodiments, the starting thickness comprises one or more of 0.5 millimeters (mm), 0.6 mm, 0.7 mm, 0.8 mm, 0.9 mm, 1.0 mm, 1.1 mm, 1.2 mm, 1.3 mm, 1.4 mm, and 1.5 mm.

Iteratively modeling application of the one or more forces to the at least the portion of the dentition at the beginning of the at least one stage may include simulating placement of the aligner model on the at least the portion of the dentition and simulating a response of the at least the portion of the dentition to the virtual placement.

Iteratively modeling application of the one or more forces to the at least the portion of the dentition may include using finite element technique to solve partial differential equations representing the one or more clinical acceptability criteria.

In some embodiments, the one or more clinical acceptability criteria may include a clinical acceptability score representing a likelihood of statistical correlation with the intended outcome. The one or more clinical acceptability criteria may indicate an acceptable biomechanical outcome for the end of the at least one stage. The acceptable biomechanical outcome may include an acceptable position of the at least the portion of the dentition at the end of the at least one stage or an acceptable force on the at least the portion of the dentition during the at least one stage. The one or more clinical acceptability criteria may indicate an acceptable physiological stress on the at least the portion of the dentition during the at least one stage. The one or more clinical acceptability criteria may indicate an acceptable aligner structural property for a device implementing the at least one stage.

In some embodiments, the at least a portion of the dentition may include a portion of one or more teeth of the dentition and the at least the portion of the aligner is configured to receive and apply the one or more forces to the one or more teeth.

In some embodiments, the dental appliance comprises a variable thickness aligner having the resulting thickness over the at least the portion of the dentition.

In some embodiments, the method may include directly fabricating the dental appliance.

The at least one stage may include one or more of: an initial stage of the treatment plan, a final stage of the treatment plan, an intermediate stage of the treatment plan, and a plurality of stages of the treatment plan.

In some embodiments, the dental appliance comprises a polymeric aligner configured to receive the dentition of the patient and to implement the one or more forces thereon.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3B depicts a tooth repositioning system including a plurality of appliances.

FIG. 8A-E shows an example of topological optimization for providing optimized force for a tooth. FIG. 8A shows a 3D canine tooth depicted; FIG. 8B shows an initial geometry for a portion of an orthodontic appliance for the canine tooth; FIG. 8C shows an example 3D model of the portion of the orthodontic appliance with the canine tooth using volumetric elements; FIG. 8D shows an example of topologically optimized contours of the modeled portion of the orthodontic appliance to reduce tipping of the canine, and the index provides the magnitude of the contour at a location; and FIG. 8E shows an optimized portion of the orthodontic appliance providing reduced tipping to the canine.

FIG. 9A shows the initial model of the canine with the portion of the orthodontic appliance from FIG. 8D, and the index provides the magnitude of the contour at a location; FIG. 9B shows an example intermediate of the canine with the portion of the orthodontic appliance with reduced tipping; FIG. 9C shows an example final model of the canine with the portion of the orthodontic appliance with reduced tipping.

FIG. 11A shows an example orthodontic appliance model using a thickness map with a corresponding force for arch expansion; FIG. 11B shows a second example of the orthodontic appliance model with variations to the thickness map and the resulting force for arch expansion; FIG. 11C shows a third example of the orthodontic appliance model with variations to the thickness map and the resulting force for arch expansion; and FIG. 11D shows a fourth example of the orthodontic appliance model with variations to the thickness map and the resulting force for arch expansion.

DETAILED DESCRIPTION

Figure 1:
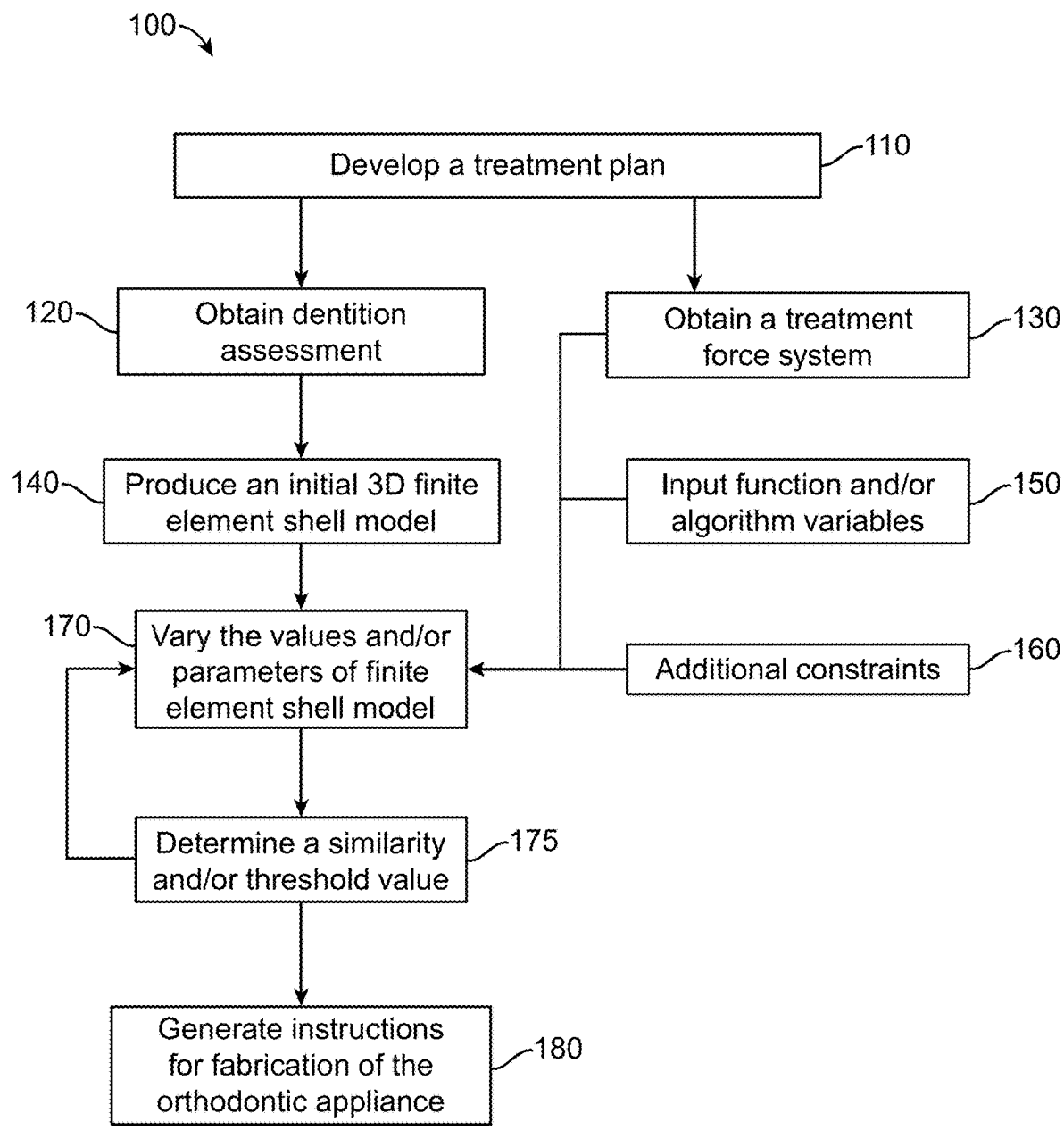
FIG. 1 depicts a schematic for a method for determining the geometry of an orthodontic appliance.

The systems, methods, and computer-readable media described herein solve significant technical problems related to efficiently designing dental appliances with geometries that effectively implement one or more stages of treatment plan(s). The systems, methods, and computer-readable media described herein may use one or more automated techniques to identify optimal physical properties of dental appliances that implement the force systems prescribed by a treatment plan. As noted herein, the automated techniques may model application of dental appliances with various geometries on a dentition and may evaluate whether or not these geometries effectively implement the intended outcomes of a stage of a treatment plan. Through automated simulations, the solutions may converge on aligner geometries that most effectively implement the stages of a treatment plan. The techniques may be advantageous when directly fabricating aligners (such as through three-dimensional (3D) printing techniques), including those having variable thicknesses.

A methodology to optimize the geometry of orthodontic appliances is described herein. A fast and robust algorithm for orthodontic appliance design is provided, which can be further enhanced by controlling the thickness of aligners. Further, a method of generating variable thickness aligners is provided.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the methods, systems, and apparatus of the present disclosure provided herein without departing from the spirit and scope of the invention as described herein.

A "patient," as used herein can include any person, including a person seeking dental/orthodontic treatment, a person undergoing dental/orthodontic treatment, and a person who has previously undergone dental/orthodontic treatment. A "patient" can include a customer or a prospective customer of orthodontic treatment, such as a person who is using the visualization tools herein to inform a decision to undergo orthodontic treatment at all or a decision to select an orthodontic treatment plan.

A "treatment plan," or "orthodontic treatment plan," as used herein, may include a plan for moving a patient's teeth from an initial arrangement to an intended arrangement using dental appliances. A treatment plan may specify a set of intermediate (e.g., incremental) stages that define arrangements between the initial and the intended arrangements through which the teeth may move. The treatment plan, as well as each of its stages, may have an "intended outcome," e.g., the position or other physical attributes intended to be achieved the stage, and an "actual outcome," e.g., the position or other physical attributes actually achieved by appliances when implementing the stage. As noted herein, the actual outcome of a treatment plan/stage may or may not be the same as the intended outcome of the treatment plan/stage. A stage of a treatment plan may implement one or more forces on teeth to achieve desired positions. The stages of a treatment plan may be associated with one or more "clinical acceptability criteria," e.g., criteria to evaluate compliance with an intended outcome of the stage. Clinical acceptability criteria may indicate an acceptable biomechanical outcome for a stage, such as an acceptable position, acceptable force, etc., that need not be the same as an intended position but is acceptable to one or more clinicians. One example of clinical acceptability criteria includes one or more clinical acceptability scores that represent a likelihood of statistical correlation with an intended outcome (e.g., if an intended outcome of a stage of a treatment plan is to move a tooth an intended displacement of 1 millimeter (mm), then clinical acceptability criteria may include clinical acceptability scores that represent standard deviations of various distances from the intended displacement).

A "dental positioning appliance" or "orthodontic appliance," as used herein, can include a set of dental appliances configured to incrementally change the position of a patient's teeth over time. As noted herein, dental positioning appliances and/or orthodontic appliances can comprise polymeric appliances configured to move a patient's teeth in accordance with an orthodontic treatment plan. As used herein the terms "dental appliance," and "tooth receiving appliance" are treated synonymously. As used herein, a "dental positioning appliance" or an "orthodontic appliance" can be treated synonymously, and can include any dental appliance configured to change the position of a patient's teeth in accordance with a plan, such as an orthodontic treatment plan. One type of dental appliance is an aligner. A "variable thickness aligner," or a "variable thickness dental appliance" as used herein, may include an appliance having a non-uniform thickness, e.g., having different thicknesses at different portions. Examples of variable thickness aligners can be found at least in U.S. Pat. Pub. No. 2017/0007359, U.S. Provisional Application No. 62/189,291, U.S. Provisional Application No. 62/189,312, and U.S. Provisional Application No. 62/189,317, the disclosures of each of which are incorporated herein by reference in their entirety as if set forth fully herein. Appliances may be fabricated using indirect or direct fabrication techniques, examples of which are discussed further herein. Examples of materials used to fabricate appliances include the materials described in: U.S. Pat. No. 9,655,693, entitled "Multilayer dental appliances and related methods and systems"; U.S. Prov. App. Ser. No. 62/677,354, entitled "CURABLE COMPOSITION FOR USE IN A HIGH TEMPERATURE LITHOGRAPHY-BASED PHOTOPOLYMERIZATION PROCESS AND METHOD OF PRODUCING CROSSLINKED POLYMERS THEREFROM"; and U.S. Prov. App. Ser. No. 62/677,364 entitled "POLYMERIZABLE MONOMERS AND METHOD OF POLYMERIZING THE SAME", the contents of all of these patent and foregoing applications being incorporated by reference as if set forth fully herein.

An "aligner model," as used herein, may include a virtual representation of a physical aligner for a stage of a treatment plan. An aligner model may include virtual representations of tooth-receiving cavities that receive a patient's dentition at a part of (e.g., at a beginning of or at an end of) a stage of the treatment plan. An aligner model may have one or more parameters that characterize its physical counterpart. Examples of such parameters include one or more "thickness parameter" that characterize the thickness of portions of a physical aligner corresponding to the aligner model. For instance, in the case of uniform thickness aligners, a thickness parameter of an aligner model may represent an intended thickness of a physical aligner corresponding to the aligner model. As another example, for variable thickness aligners, one or more thickness parameters may represent thicknesses of various regions of a physical aligner, including but not limited to areas around specific teeth and/or portions of a dentition. An aligner model may, but need not, form the basis of a virtual object used to directly form a physical aligner. As an example, an aligner model, as used herein, may but need not be different than a file used to 3D print an aligner.

An aligner model may be used to model application of forces to a dentition. In some implementations, differential geometries between an aligner model and a virtual model of dentition that receive a physical aligner corresponding to the aligner model may form the basis of forces the physical aligner is likely to impart to the dentition during a stage of a treatment plan. The force models may include "iterative" force models where a parameter of an aligner model is varied (e.g., iterated) and the resulting application of forces to a dentition modeled until a condition is satisfied. Examples of conditions include the finding of a satisfactory outcome, e.g., an outcome of a stage that satisfies clinical acceptability criteria. Additional examples of conditions include, for a given number of modeling operations, identifying a single parameter value for which an aligner model is closer to a satisfying clinical acceptability criteria, than other parameter values.

As used herein the term "and/or" can be used as a functional word to indicate that two words or expressions are to be taken together or individually. For example, the phrase "A and/or B" encompasses A alone, B alone, and A and B together. Depending on context, the term "or" need not exclude one of a plurality of words/expressions. As an example, the phrase "A or B" need not exclude A and B together.

As used herein the terms "torque" and "moment" are treated synonymously.

As used herein a "moment" can encompass a force acting on an object such as a tooth at a distance from a center of resistance. The moment can be calculated with a vector cross product of a vector force applied to a location corresponding to a displacement vector from the center of resistance, for example. The moment can comprise a vector pointing in a direction. A moment opposing another moment can encompass one of the moment vectors oriented toward a first side of the object such as the tooth and the other moment vector oriented toward an opposite side of the object such as tooth, for example. Any discussion herein referring to application of forces on a patient's teeth is equally applicable to application of moments on the teeth, and vice-versa.

As used herein a "plurality of teeth" can encompass two or more teeth. A plurality of teeth can, but need not, comprise adjacent teeth. In some embodiments, one or more posterior teeth comprises one or more of a molar, a premolar or a canine, and one or more anterior teeth comprising one or more of a central incisor, a lateral incisor, a cuspid, a first bicuspid or a second bicuspid. A "portion" of a dentition may comprise a part of the dentition, such as areas around specific teeth, areas around specific interproximal regions, areas near specific occlusal regions, etc.

The embodiments disclosed herein can be well suited for moving one or more teeth of the first group of one or more teeth or moving one or more of the second group of one or more teeth, and combinations thereof.

In certain embodiments, a method of determining the geometry of an orthodontic appliance is provided, the method comprising the steps of (i) providing a treatment plan, wherein the treatment plan comprises an initial position of a patient's teeth, a final position of the patient's teeth, a plurality of stages to move the patient's teeth from the initial position towards the final position, and a treatment force for each of the plurality of stages to move the patient's teeth; (ii) generating an initial 3D model of an orthodontic appliance (also referred to as an aligner), the initial 3D model comprising a plurality of tooth-receiving cavities to receive the patient's teeth being positioned to produce the treatment force; (iii) producing a finite element shell model comprising a plurality of shell elements according to the initial 3D model; (iv) determining a first modeled force based on the finite element shell model, thereby generating at least one intermediate 3D model, the intermediate 3D model comprising a second modeled force to move the patient's teeth toward the final position; (v) comparing at least one of the first modeled force and the second modeled force with the treatment force to provide a similarity value; and (vi) repeating the varying until a threshold shell element value, a threshold similarity value, or a combination thereof is obtained.

In some embodiments, the method of determining the geometry of an orthodontic appliance further comprises the step of generating instructions for fabrication of the orthodontic appliance.

FIG. 1 depicts a schematic of method 100 for determining the geometry of an orthodontic appliance. Method 100 provides an example process for determining the geometry of an orthodontic appliance using an initial 3D model and a finite element shell model. At block 110, a treatment plan is developed. At block 120 a dentition assessment is obtained. At block 120, a dentition assessment is obtained for each stage of the treatment plan. In some embodiments, the dentition assessment is used to produce a model of a patient's teeth, and at block 140 an initial 3D model of an orthodontic appliance can be produced. Further at block 140, a finite element shell model of the orthodontic appliance can be generated. In some embodiments the finite element shell model at block 140 can be a topological discrete element density map, a parametric analytic thickness map, a sizing discrete thickness map, or a shell element model.

In some embodiments of method 100, at block 130 a treatment force system is obtained in order to provide the tooth and/or teeth movement, progressing the patient's teeth from an initial stage toward a final alignment. In certain embodiments of method 100, the finite element shell model at block 140 has a force system which is compared with the treatment force system from block 130. At block 170 of method 100, the parameters and/or values of the finite element shell model from block 140 are varied in order to improve the orthodontic appliance. At block 150, additional inputs can be added into the variation of the element shell model, such as providing constraints from manufacturing, providing aesthetic parameters, providing input functions or algorithm variables, and the like. At block 160, additional manufacturing constraints can be added as needed, such as variables added to improve the calculations generated by the variation of parameters. In certain embodiments at block 160, the additional constraints include topological values for a discrete element map, parametric values for a parametric thickness map, sizing values for a discrete thickness map, or values of a finite element shell model.

Providing constraints at 160 can increase efficiency of modeling, improve patient comfort, and increase efficiency of treatment. As a non-limiting example, a model of an aligner without having constraints provided at 160 can take multiple days to process, while input constraints at 160 can decrease the time. Inputs at block 160 can include providing a baseline local thickness that is relatively greater than or less than the thickness of the rest of the modeled orthodontic appliance. As a non-limiting example, an aligner comprising a missing tooth can include increased thickness around said missing tooth in order to provide increased and/or sufficient force to nearby target teeth. Another example input at 160 is a constraint for patient comfort, such as a constraint on the formation of spikes which can cause pain or discomfort.

In some embodiments, a penalization parameter is provided as an additional constraint at 160, such as a penalization for an aligner surface that comprises a spike or too many spikes. The penalization parameter can account for surface roughness (e.g., the maximum difference between peak height and valley depth on one surface within a radius) and can decrease or eliminate the formation of spikes.

In some embodiments, the additional constraint at 160 increases the smoothness of the orthodontic appliance. In some embodiments, the additional constraint comprises focusing force of an aligner locally and/or in one force direction. In some embodiments, the additional constraint at 160 and/or the input function at 150 removes material from the outer surface of the modeled orthodontic appliance before removing material from the inner surface (e.g., a patient's mold can be overlaid with a modeled aligner shell and optimization occurs to the outer surface of the modeled orthodontic appliance so no new gaps appear between the optimized aligner shell and the patient's mold). In some embodiments, the additional constraint at 160 and/or the input function at 150 removes only material from the outer surface of the modeled orthodontic appliance.

Figure 12A:
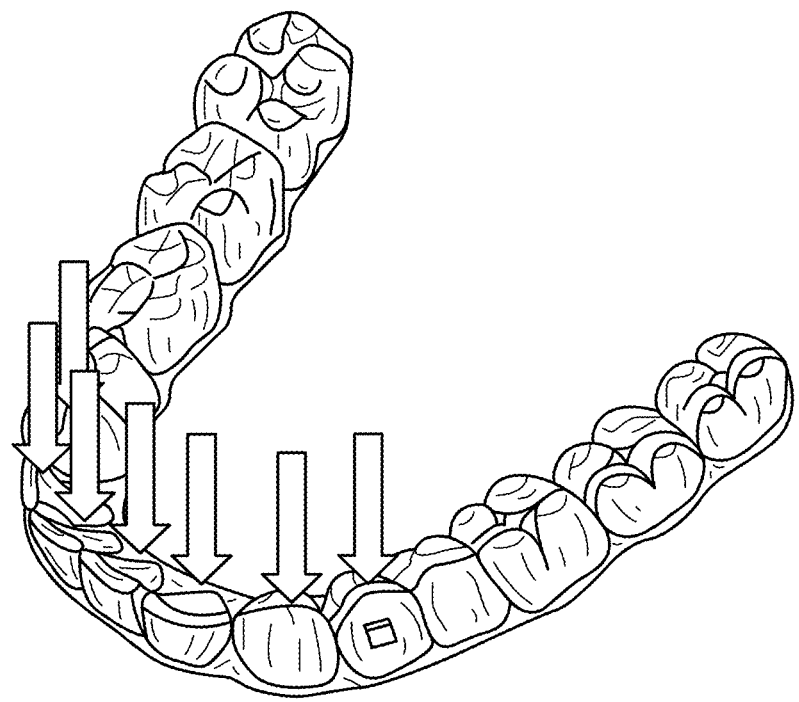
FIG. 12A shows an example of desired unidirectional movement for multiple consecutive teeth, with an intrusion force unidirectionally applied from canine-to-canine.
Figure 12B:
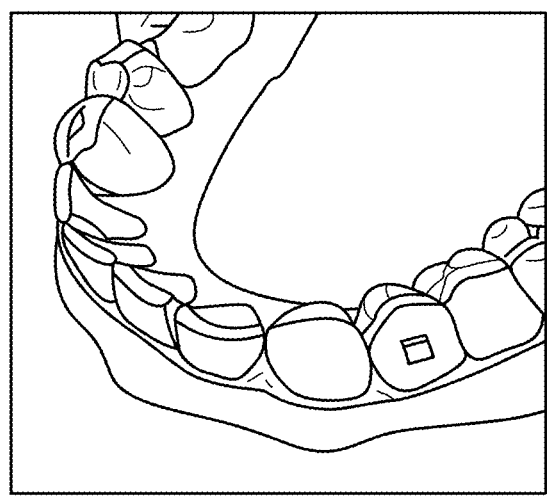
FIG. 12B shows an example model area, from first premolar to first premolar.

In some embodiments, the input function at 150 and/or the additional constraints at 160 include unidirectional movements of multiple teeth. In certain embodiments, the unidirectional movement of multiple teeth comprises multiple consecutive teeth. As a non-limiting example, it can be desirable for multiple teeth to move in the same direction (e.g., multiple-tooth intrusion, proclination, or expansion), and the input function, algorithm variables, or additional constraints can maximize the minimum force in the moving direction; see, e.g., FIG. 12A. In some embodiments, an optimization target is used in the model, and in certain embodiments the optimization target is maximizing the minimum amount of force for moving multiple consecutive teeth in a direction. In some embodiments, the constraints can be limited such that the unidirectional movement design region includes the region of the multiple consecutive teeth, the multiple consecutive teeth plus one neighboring tooth on each side, the multiple consecutive teeth plus two neighboring teeth on each side, or the multiple consecutive teeth plus three neighboring teeth on each side. As a non-limiting example, modeling an orthodontic appliance intruding canine-to-canine can have a design region optimizing the minimum force in the moving direction, and the design region can include from first premolar to first premolar (i.e., the multiple consecutive teeth plus one neighboring tooth on each side); see, e.g.: FIG. 12A (unidirectional movement of canine-to-canine) and FIG. 12B (example model region from first premolar to first premolar).

In some embodiments of method 100 at block 170, the variation of the parameters and/or values of the finite element shell model can continue until the geometry of an orthodontic appliance having a threshold value or score is determined. At block 180, instructions for the fabrication of the orthodontic appliance are generated.

Developing a Treatment Plan

At block 110 of method 100, a treatment plan is developed having a desired therapeutic force system. Certain amounts of force and moments can directionally induce programmed movements of the patient's teeth. At block 120, a dentition assessment can be obtained, and a desired force system can be arranged based on the patient's dentition. In some embodiments at block 130, an appropriate moment to force ratio can be determined to provide a therapeutic movement of the patient's teeth. The therapeutic force can be part of a therapeutic force system, also referred to as an ideal force system and a treatment force system.

In some embodiments, the treatment plan developed at block 110 can include only initial and final positions of the patient's teeth. In some embodiments the treatment plan at block 110 can include an initial position, a final position, and a plurality of intermediate positions between the initial and final positions. In certain embodiments, each of the intermediate positions is considered a "stage" which can move the patient's teeth toward the final position. In some embodiments, the treatment plan comprises a plurality of stages (also referred to herein as a plurality of steps). Each of the plurality of stages can have its own initial and final position. In some embodiments, a treatment plan can comprise a plurality of stages to move the patient's teeth successively from the initial position toward the final position. At block 130, each stage of a treatment plan can provide a treatment force (also referred to herein as a "therapeutic force" and as an "ideal force") which can be applied to at least one of the plurality of teeth to provide the movement force to move the patient's teeth toward the final position. The treatment force of each stage can comprise one or more force systems applied to the patient's tooth and/or teeth.

In certain embodiments, a treatment plan may include a 3D model of an orthodontic appliance and a 3D model of the patient's teeth. Placement of an initial 3D model of the orthodontic appliance over the 3D model of the patient's teeth applies therapeutic forces to gradually move the teeth into a new configuration. Repetition of this process with successive 3D models of orthodontic appliances comprising new configurations eventually moves the teeth through a series of intermediate configurations or alignment patterns to a final desired configuration.

In some cases, only certain teeth received by a 3D modeled orthodontic appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. In some embodiments, no wires or other means will be provided for holding an appliance in place over the teeth. In some cases, however, it may be desirable or necessary to provide individual attachments or other anchoring elements on teeth with corresponding receptacles or apertures in the appliance so that the appliance can apply a selected force on the tooth.

The target final arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

At block 130, a treatment force system can be developed that enables the movement paths developed with the treatment plan. In certain embodiments, a treatment force system can be developed for each stage of the plurality of stages of the treatment plan.

In some embodiments, the treatment plan comprises unidirectional movement of multiple consecutive teeth (e.g., unidirectional movement for anterior intrusion), tooth retroclination (e.g., anterior tooth retroclination), root control (e.g., mesial-distal root control), root torque (e.g., lingual root torque), or any combination thereof.

Initial 3D Model

At block 140 of method 100, an initial three-dimensional (3D or 3-D) model of an orthodontic appliance can be generated. In some embodiments, the initial 3D model of the orthodontic appliance is based on a model of a patient's teeth. In certain embodiments, the initial 3D model of the orthodontic appliance is based on a 3D model of the patient's teeth. In some embodiments, an initial 3D model of the orthodontic appliance is generated for each step of the treatment plan developed at block 110, the treatment plan comprising a plurality of stages to move the patient's teeth from an initial position towards a final position.

Dental models of a patient's teeth and mouth can be obtained in a variety of ways. In some embodiments at block 120, a dental model of a patient's teeth is obtained with a dentition assessment. The patient's teeth can be scanned or imaged to build a 3D surface model of the patient's teeth using well known technology, such as X-rays, 3D X-rays, computer-aided tomographic images or data sets, and magnetic resonance images. These models are typically a 3D mesh model of the patient's upper and lower arches, including both teeth and gingiva.

After constructing a 3D model of the tooth surfaces, models of the patient's individual teeth can be derived. In one approach, individual teeth and other components are segmented to permit individual repositioning or removal of teeth in or from the digital data. The teeth in the model can be segmented either manually or automatically, as known in the art. Each tooth can then be represented by a 3D mesh model. In certain embodiments, a computed model of a patient's dentition can be used to reduce the memory and computation demands when manipulating, comparing, or otherwise using digital models.

In some embodiments of block 140, the initial 3D model of an orthodontic appliance (in some embodiments referred to as the initial 3D model of an aligner) comprises a plurality of tooth-receiving cavities to receive the patient's teeth and/or the 3D model of the patient's teeth. In some embodiments, the initial 3D model of the orthodontic appliance has a plurality of tooth-receiving cavities positioned to produce a treatment force that move the patient's teeth from an initial position toward a final position (also referred to as a "target position"). For example, the initial 3D model of the orthodontic appliance can be shaped such that placement of the appliance over the patient's teeth applies controlled forces to gradually move the teeth into a new configuration. Repetition of this process with successive appliances, each comprising new configurations based on 3D models eventually moves the teeth through a series of intermediate configurations or alignment patterns to a final desired configuration. The repetition of this process with successive appliances can be according to the treatment plan developed at block 110.

In some embodiments, the initial 3D model can be based on a known orthodontic positioning principal. In certain embodiments, the initial 3D model can be based on a plurality of known orthodontic positioning principals.

The initial 3D model of the appliance can have a layout to accommodate the teeth of the patient (e.g., the topography of the tooth-receiving cavities matches the topography of the patient's teeth), and can be fabricated based on positive or negative models of the patient's teeth generated by impression, scanning, and the like.

Producing a Finite Element Shell Model

At block 140 of method 100, a finite element shell model can be produced. Simulations of the initial 3D model of the orthodontic appliance and/or the patient's teeth can include complex calculations. In simulations using finite element analysis, a system or object can be represented by a geometrically similar model consisting of numerous interconnected and simplified areas (also referred to as "volume elements" or "shell elements") of discrete regions, which make up the finite elements. Using this approach, complex calculations can be broken into the calculation of smaller sub-calculations, representing the discrete regions. A finite element shell model can divide the surface of a finite element model into a plurality of shell elements to provide a 3D surface having a polygonal shape. In some embodiments, the 3D surface having a polygonal shape is a planar 3D surface (e.g., the shell elements can be 2D but have a geometry to provide a 3D representation).

In some embodiments, a finite element shell model comprising a plurality of shell elements is provided according to the initial 3D model of the orthodontic appliance. The finite element shell model can comprise a 2D mesh model represented in a 3D space (also referred to herein as the "3D mesh model"). The 3D mesh model can be characterized by nodes, and/or by nodes with which the 3D mesh model is cross-linked with other finite shell elements. As a non-limiting example, the finite element shell model can be a mesh model of shell elements shaped according to the initial 3D model of the orthodontic appliance.

The use of the finite element shell models of block 140 as disclosed herein, used in comparison to other modeling techniques, can provide unexpected benefits such as decreasing modeling computation time, in part because the modeling of features can be represented with fewer variables. In some circumstances, the finite element shell models provided herein can provide processes and calculations that are greater than 100-fold faster when compared to traditional solid orthodontic appliance models. This can allow for iterative searching to be conducted without onerously time-consuming calculations. In some embodiments, the finite element shell model is a thick shell model. In other embodiments, the finite element shell model is a thin shell model.

At block 140 of method 100, an initial finite element shell model can be approximated from the initial 3D model of the orthodontic appliance. Variations to the finite element shell model at block 170 can produce a plurality of intermediate 3D models.

The finite element shell model can represent an assortment of shell elements, based on input parameters. As a non-limiting example, the finite element shell model can represent a parametric thickness map, a topological density map, a discrete thickness map, or a combination thereof.

In some embodiments at block 140, the finite element shell model is represented with a parametric thickness map.

The shell elements can have an initial value based on a representative thickness, and the finite element shell model can represent thickness map functions with initial parameters. The parametric thickness map describes a 3D model of the orthodontic appliance's thickness based on a point's coordinate in the tooth local coordinate system. In some embodiments, the parametric thickness map describes the initial 3D model of the orthodontic appliance's thickness based on a point's coordinate in the tooth local coordinate system. The point's coordinate in the tooth local coordinate system can be based on the coordinates set by at least one of the patient's teeth, as represented by the 3D model of the patient's teeth.

In some embodiments at block 140, the parametric thickness map of the finite element shell model can be based on the point's coordinate in the local coordinate system, and the coordinates can represent, as non-limiting examples, location relative to the buccal, labial, vestibular, or lingual side of a tooth, how close the point is to the incisal edge or the gingiva, how close the point is to the cusp or gingival edge, proximity to the interproximal edge, or how close the point is to a neighboring tooth (e.g., proximal, mesial, and/or distal). In some embodiments the thickness map can be based on the point's coordinate in the local coordinate system, and the coordinates can represent, as non-limiting examples, location relative to a quadrant of the two dental arches, relative location to the maxillary right quadrant, relative location to the maxillary left quadrant, relative location to the mandibular right quadrant, relative location to the mandibular left quadrant, relative location to the midline, relative location to the facial side of the arch, relative location to the lingual side of the arch, relative location to the occlusal plane, or the relative arch position.

Figure 2A:
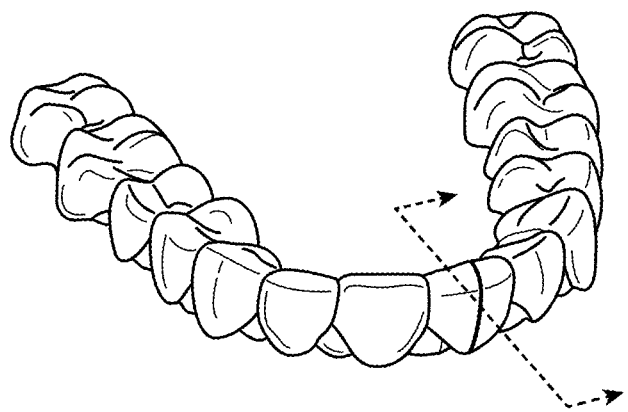
FIG. 2A depicts an example finite element shell model of an orthodontic appliance.
Figure 2B:
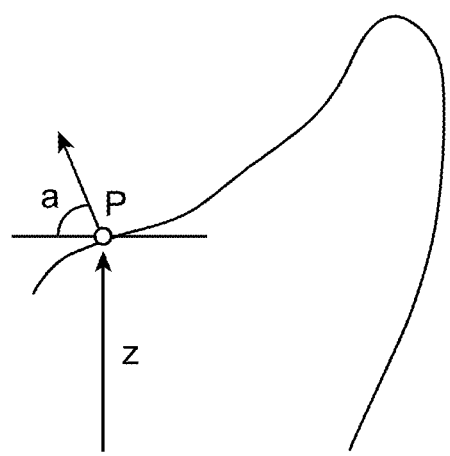
FIG. 2B depicts a cross section of the shell model in FIG. 2A and provides an example thickness function.

The parametric thickness map can be parameterized based on each coordinate point on the finite element shell model. An example of a parametric thickness function is represented in FIG. 2A. FIG. 2A shows an example finite element shell model of an orthodontic appliance (e.g., an aligner surface). A cross section of the finite element shell model shows the local coordinate system of a representative tooth (FIG. 2B). FIG. 2B shows a surface cross section across the sagittal plane of a central incisor, and provides an example thickness function. The parametric thickness map can have a thickness determined on a coordinate system, and the coordinate system can be provided by selected parameters. In FIG. 2, the thickness (t) at point P is a function of height (z) and surface normal angle (a). The thickness function can be expressed as:

$$t = Az + B\sin(a) \qquad \text{eq. (1)}$$

Figure 2C:
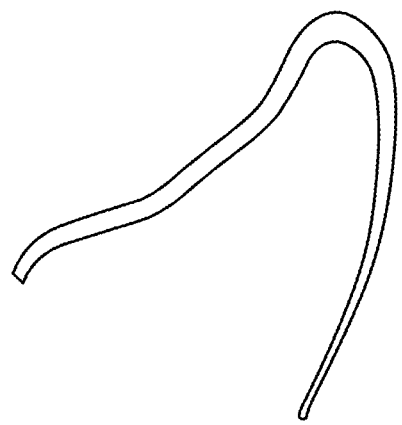
FIG. 2C depicts a cross section of an orthodontic appliance whose thickness is defined by a parametric function and provides an example solid cross section.

The coefficients A and B can be the parameters for optimization. FIG. 2C shows a surface cross section across the sagittal plane of a central incisor, and provides an example solid cross section representing a value selected for parameters A and B.

In some embodiments, the initial finite element shell model at block 140 comprises a uniform thickness map (i.e., representative of a uniform thickness orthodontic appliance). In other embodiments, the initial finite element shell model comprises variation to the thickness map, which can, for example, be provided in accordance to the parametric function. In certain embodiments, the thickness map can have unconditional convergence when calculating the force system on at least one tooth. A thickness map having unconditional convergence when calculating the force system on at least one tooth can be more robust in comparison to models typically used in traditional solid orthodontic appliance models.

In certain embodiments at block 140, a finite element shell model using a parametric thickness map provides an orthodontic appliance that is smooth. The nature of the parametric thickness map and the variations conducted thereon can provide an orthodontic appliance that is both aesthetic and comfortable for the patient.

In some embodiments at block 140, the finite element shell model represents a topological discrete element density map. The shell elements can have an initial value based on a representative density, and the finite element shell model can represent density map functions with elemental density for each element shell. The topological discrete element density map describes the initial 3D model of the orthodontic appliance's density based on a shell element's location in the tooth local coordinate system. The tooth local coordinate system can be based on the coordinates set by at least one of the patient's teeth, as represented by the 3D model of the patient's teeth. In particular embodiments, the initial topological density map represents an orthodontic appliance that has more material than is needed. An element density number is provided for each point of the shell mesh for the finite element shell model, and each element density number has a value from 0 to 1. In some embodiments, the value for each element density number has a value of 1 prior to the variation of values at block 170 of method 100. In some embodiments, the value for at least one element density number has a value of 1 prior to the variation of values at block 170 of method 100.

The topological discrete element density map can be based on the shell element's location in the local coordinate system, and the coordinates can represent, as non-limiting examples, location relative to the buccal, labial, vestibular, or lingual side of a tooth, how close the point is to the incisal edge or the gingiva, how close the point is to a neighboring tooth (e.g., proximal, mesial, and/or distal), a quadrant of the two dental arches, how close the point is to the cusp or gingival edge, proximity to the interproximal edge, or the arch position.

In some embodiments at block 140, the finite element shell model represents a sizing discrete thickness map. The shell elements can have an initial value based on a representative thickness, and the finite element shell model can represent sizing discrete thickness map functions with elemental thickness for each element shell. The thickness map describes the initial 3D model of the orthodontic appliance's thickness based on an element value.

In certain embodiments at block 140, the initial sizing discrete thickness map represents an aligner that has more material than is needed. An element thickness number is provided for each point of the shell mesh for the finite element shell model, and each element thickness number has a value from 0 to 1. In some embodiments, the value for each element thickness number has a value of 1 prior to the variation of values at block 170 of method 100. In some embodiments, the value for at least one element thickness number has a value of 1 prior to the variation of values at block 170 of method 100. In certain embodiments, the element thickness number can be scaled to an actual thickness value. As a non-limiting example, the element thickness number can be scaled to an actual thickness value of 1 mm, such that a thickness number of 1 is representative of an actual thickness of 1 mm, a thickness number of 0 is representative of an actual thickness of 0 mm, and a thickness number of 5 is representative of an actual thickness of 0.5 mm. In some embodiments, the thickness number can be scaled such that the thickness number of 1 is representative of 5.0 mm, 4.9 mm, 4.8 mm, 4.7 mm, 4.6 mm, 4.5 mm, 4.4 mm, 4.3 mm, 4.2 mm, 4.1 mm, 4.0 mm, 3.9 mm, 3.8 mm, 3.7 mm, 3.6 mm, 3.5 mm, 3.4 mm, 3.3 mm, 3.2 mm, 3.1 mm, 3.0 mm, 2.9 mm, 2.8 mm, 2.7 mm, 2.6 mm, 2.5 mm, 2.4 mm, 2.3 mm, 2.2 mm, 2.1 mm, 2.0 mm, 1.9 mm, 1.8 mm, 1.7 mm, 1.6 mm, 1.5 mm, 1.4 mm, 1.3 mm, 1.2 mm, 1.1 mm, 1.0 mm, 0.9 mm, 0.8 mm, 0.7 mm, 0.6 mm, 0.5 mm, 0.4 mm, 0.3 mm, 0.2 mm, 0.1 mm, or a value that is less than 0.1 mm but greater than 0 mm.

Changes to the finite element shell model at block 170 provide different forces as modeled by the treatment plan of block 110. For example, a change in the values in the finite element shell model from block 140 can result in a change in the modeled forces, thus increasing or decreasing the amount of force provided to the patient's teeth. At block 140 of method 100, the finite element shell model of the initial 3D model of the orthodontic appliance has a first modeled force. In certain embodiments, this first modeled force at block 140 is substantially similar to the therapeutic force at block 130 for the stage of the treatment plan of block 110. In some embodiments, the first modeled force is determined and/or calculated. In some embodiments, the first modeled force is determined through computational modeling.

In some embodiments, the first modeled force is greater than 99% similar to the therapeutic force, greater than 98% similar to the therapeutic force, greater than 97% similar to the therapeutic force, greater than 96% similar to the therapeutic force, greater than 95% similar to the therapeutic force, greater than 94% similar to the therapeutic force, greater than 93% similar to the therapeutic force, greater than 92% similar to the therapeutic force, greater than 91% similar to the therapeutic force, greater than 90% similar to the therapeutic force, greater than 85% similar to the therapeutic force, greater than 80% similar to the therapeutic force, greater than 75% similar to the therapeutic force, greater than 70% similar to the therapeutic force, greater than 65% similar to the therapeutic force, greater than 60% similar to the therapeutic force, greater than 55% similar to the therapeutic force, or greater than 50% similar to the therapeutic force.

Variation of Values or Parameters

In some embodiments of method 100 at block 170, the finite element shell model from block 140 can be varied by providing changes to the shell elements. In some embodiments of block 170, a finite element analysis platform is used to analyze the modeled force system. In certain embodiments, at least one shell element is varied. In some embodiments, at least one shell element is randomly varied. In some embodiments of block 170, the resulting intermediate 3D mesh model (also referred to herein as the "intermediate 3D model") takes the varied finite element shell model as an input, determines the force on at least one tooth, and compares that to a corresponding treatment force from block 130.

In some embodiments at block 170, variation to the finite element shell model imparts a force system which is then compared at block 175 with the therapeutic force of block 130. In some embodiments, the comparison provides a score, and the score or plurality of scores can be used to determine whether the force system can achieve the therapeutic goal. As a non-limiting example, an intermediate 3D model at block 170 can have a force system (also referred to as an "intermediate force system" or a "second modeled force") that is more similar to the therapeutic force system at block 130 than that provided by the initial 3D model at block 140. In some embodiments at block 175, a similarity value is determined, comparing the modeled force system to the therapeutic force system. In certain embodiments, a scorer is determined.

In some embodiments at block 170, variation to the finite element shell model imparts a force system which is then compared with the therapeutic force of block 130, and the accuracy of the force system of at least one tooth is determined at block 175. As a non-limiting example, a finite element shell model that imparts a force system which is identical to the force system at a tooth can be considered to be 100% accurate, with regards to said tooth. In some embodiments, the accuracy of the force system of a single tooth is determined. In some embodiments, the accuracy of the force system of a plurality of teeth is determined. In some embodiments, the accuracy of the entire treatment force system is determined.

In some embodiments at block 175, variation of the finite element shell model provides a materials score, which corresponds to the amount of material used to fabricate a corresponding orthodontic appliance. In some embodiments, the materials score has a value between 0 and 1, which is scaled to an actual value of mass. As a non-limiting example, a materials score having a value of 1 scaled to 5 grams, and a value of 0 representing 0 grams would have a corresponding value of 0.5 representative to 2.5 grams. In some embodiments, the materials score has a value of 1 that represents from 5 grams to 1 mg, from 4 grams to 1 mg, from 3 grams to 1 mg, from 2 grams to 1 mg, from 1 gram to 1 mg, from 500 mg to 1 mg, from 250 mg to 1 mg, or from 125 mg to 1 mg; and a value of 0 that is scaled to a value of 0 grams.

In some embodiments of block 175, multiple comparisons can be used in the development of the orthodontic appliance. As a non-limiting example, variation to the values of the finite element shell model can result in the formation of more than one model that provides greater than 99% similarity to the treatment force system, but each model having different materials scores; thus an orthodontic appliance can be created having a similar force system while using a decreased amount of material.

At block 170 of method 100, finite element analysis can be conducted to determine how much variation can be done until a desired orthodontic appliance is represented. For example, a parametric thickness map can be represented at block 140, and variations to the shell elements can produce an intermediate force system in block 170 that is then evaluated at block 175 for similarity to the desired therapeutic force system of block 130. Based on the output of this intermediate force system at block 170, a calculation can be done to decide which shell element to next vary, or whether a random perturbation should be attempted. The calculations and comparisons at block 175 to intermediate 3D models and intermediate force systems of block 170 can be repeated until a threshold score, similarity value, material score, or any combination thereof is obtained.

In some embodiments of block 170, at least one discrete finite shell element is varied. In certain embodiments, the entire finite element shell model from block 140 is varied at block 170. As a non-limiting example, a finite element shell model having a uniform parametric thickness map can be varied, generating an intermediate 3D model that has a non-uniform parametric thickness map. In some embodiments, a parametric algorithm is used to vary a parametric thickness map.

The varied shell element model at block 170 can provide a second modeled force, which can be compared at block 175 with the first modeled force (i.e., the modeled force based on the initial finite element shell model at block 140). In some embodiments of block 170, varying at least one shell element of the finite element shell model generates at least one intermediate 3D model, the intermediate 3D model comprising the second modeled force to move the patient's teeth toward the final position. In certain embodiments, the second modeled force from block 170 is more similar to the treatment force of block 130 than the first modeled force from block 140.

In certain embodiments of block 170, the at least one shell element of the finite element shell model from block 140 is varied using an algorithm, and optionally using software. In some embodiments, the finite element shell model of a parametric thickness map can be varied using gradient-based methods, and/or secant methods. In some embodiments, the finite element shell model of a parametric thickness map can be varied using software known in the art, such as Artelys Knitro, MATLAB Optimization Toolbox, and pyOpt platforms. In some embodiments, the finite element shell model of a topological density map and/or the finite element shell model of a discrete thickness map can be varied using a method of moving asymptotes. In certain embodiments, the method of moving asymptotes comprises an iterative method for solving and/or approximating at least one value at block 175 (e.g., a minimum material value required to generate an orthodontic appliance having at least 95% similarity to the treatment force system). In some embodiments, the method of moving asymptotes comprises an iterative process of generating a subproblem that is solved. In some embodiments, the method of moving asymptotes iteratively solves a function relating to the finite element shell model.

The modeled force of block 170 can be varied with basis of an input function (e.g., the asymptote moving function) until a threshold value is realized at block 175, until further iterations of the function do not generate a threshold variation at block 175 (e.g., a convergence value is observed), or a combination thereof.

In some embodiments at block 170, a finite element shell model can be varied using explicit time stepping methods. An explicit method can calculate the state of a system at a later time from the state of the system at the current time, which is in contrast to implicit time methods, which can find a solution by solving an equation involving both current and future states of the system. As a non-limiting example, an explicit time stepping method provides initial positions and orientations of all objects in a model, including the shell elements' position and orientation, as well as the positions and orientations following a time step (e.g., to a known or calculated value). The use of explicit time stepping methods can reduce computations and improve method throughput. In certain embodiments, the explicit time stepping method utilizes mass scaling to accelerate simulation runs. In some embodiments, an implicit time stepping method can be used.

In certain embodiments of block 170, the finite element shell model can be varied using additional constraints, as can be provided at block 160. In an embodiment, a finite element shell model can be varied using a constrained search space. For example, the parametric thickness map can be defined with a decreased number of parameters in order to reduce the search space. Decreasing the number of parameters can provide increased performance of calculations. Increasing the number of parameters can provide a more accurate representation of, for example, the modeled forces of the finite element shell models.

In certain embodiments of block 170, the finite element shell model can be varied using additional input functions or algorithms as can be provided at block 150. In an embodiment, the techniques used to vary the finite element shell model can use a sensitivity-based algorithm. For example, to maximize strength of an orthodontic appliance (e.g., in situations where accurate forces and/or accurate moments are not the primary objective), the method can be optimized such that no gradient is used. By varying the method in this manner, a reduction of calculation time can be realized.

Parametric Thickness Map

In certain embodiments of block 140, the initial 3D model comprises a finite element shell model produced having a parametric thickness map defined by a parametric function. In some embodiments of block 150, the input function used to vary the parametric thickness map comprises a parametric algorithm. The thickness map can be varied by altering the parameters of the parametric algorithm and/or a sizing function, thus generating an intermediate 3D model of the orthodontic device at block 170.

In some embodiments of block 170, the finite element shell model of block 140 is varied in multiple iterations, further transforming the parametric thickness map defined by the parametric function. The varying can end, as non-limiting examples, at block 175 when further iterations do not provide a benefit to decreasing the size of the 3D model of the aligner, and/or when a threshold value is met, such as a value of similarity between the first modeled force, the second modeled force, the treatment force, or any combination thereof.

A non-limiting example of using a parameter thickness map to model an orthodontic appliance includes the modeling of an aligner. In some embodiments, an orthodontic appliance provides an arch expansion force. In some embodiments, the aligner can be modeled for a patient missing at least one tooth, which results in decreased contact between the orthodontic appliance and teeth in comparison to a patient having said missing at least one tooth. Such a missing tooth results in a decreased level of anchorage, and parametric modeling with parametric thickness maps can be used to iteratively optimize the force system. If a patient has a missing tooth, an aligner designed with conventional means may not provide sufficient force to move the target tooth (or teeth) and provide treatment (e.g., a missing tooth may result in an aligner that cannot sufficiently move a molar in the distal direction). A parametric model can be used to model locally increase wall thickness, which can increase force to the target tooth (or teeth). As a non-limiting example, an orthodontic appliance providing an arch expansion force can be designed with focus on a design region within two teeth of the missing tooth, and the model can maximize expansive force on the target tooth (or teeth), which can simplify calculations and computer models (FIG. 11A-D).

In some embodiments, parametric thickness maps and algorithms are provided with an input having a higher level of thickness in a region in order to reduce processing required for regions with high stress concentrations. As a non-limiting example, a thickness map for an orthodontic appliance with arch expansion force can include an increased baseline thickness for the region of expansion, which can decrease the calculation time in comparison to randomized algorithms.

In some embodiments, a parametric thickness map and/or model can be used to generate an orthodontic appliance for a patient having a missing tooth, an orthodontic appliance providing an arch expansion force, an orthodontic appliance comprising a space closure, can be used to generate an orthodontic appliance that addresses a breakage issue, or any combination of the above.

In some embodiments, the parametric thickness map begins with a "fat" or overly thick orthodontic appliance, and iteratively thins during the modeling process. In some embodiments, the parametric thickness model uses random perturbations on thickness, which can apply artificial aberrations, and optimization can occur therefrom. In preferred embodiments, the parametric thickness model comprises constraints (e.g., block 160 at FIG. 1). A so-called "fat" thickness map may be a map with a thickness greater than an expected final thickness at each location.

Topological Density Map

In certain embodiments of block 140, the initial 3D model comprises a finite element shell model produced having a topological density map defined by a topological algorithm. In some embodiments of block 150, the input function used to vary the topological density map comprises a topological algorithm. The topological density map can be varied by altering the parameters of the topological algorithm, thus generating an intermediate 3D model of the orthodontic device at block 170.

In some embodiments, the topological density map is uniform, and the variation of value at block 170 to the shell elements is applied to all of the shell elements. In other embodiments, the topological density map is not uniform following variation. In some embodiments, each individual shell element has a value from 0 to 1. In some embodiments, each individual shell element has a value between 0 and 1. In certain embodiments, none of the individual shell elements has a value of 0.

In some embodiments at block 170, the discrete element density map defined by the topological function is varied, generating an intermediate 3D model of the orthodontic device. The discrete element density map can be varied by altering the topological function, thus generating an intermediate 3D model of the orthodontic device. The intermediate 3D model of the orthodontic device at block 140 has a second modeled force.

At block 175, a comparison can be made between the first modeled force of block 130, the second modeled force of block 170, the treatment force as provided by the treatment plan of block 110, or any combination thereof.

Optionally, the finite element shell model at block 140 is varied in multiple iterations, further transforming the discrete element density map defined by the topological function. The varying can end, as non-limiting examples, when further iterations do not provide a benefit to decreasing the size of the 3D model of the aligner, and/or when a threshold value is met, such as a value of similarity between the first modeled force, the second modeled force, the treatment force, or any combination thereof.

In some embodiments, the topological density model moves material in a non-parametric manner. In some embodiment, the topological density model can trade off volume between one location and another location during optimization. For example, a give mass of maximum mass of material may be used for an aligner and once or if this mass is reached during the optimization process, then rather than adding additional volume during optimization, the mass or volume is conserved during the modeling process such that adding volume or mass in one location results in removal of volume or mass in another. In some embodiments, the topological density model uses random perturbations on thickness, which can apply artificial aberrations, and optimization can occur therefrom.

Figure 14:
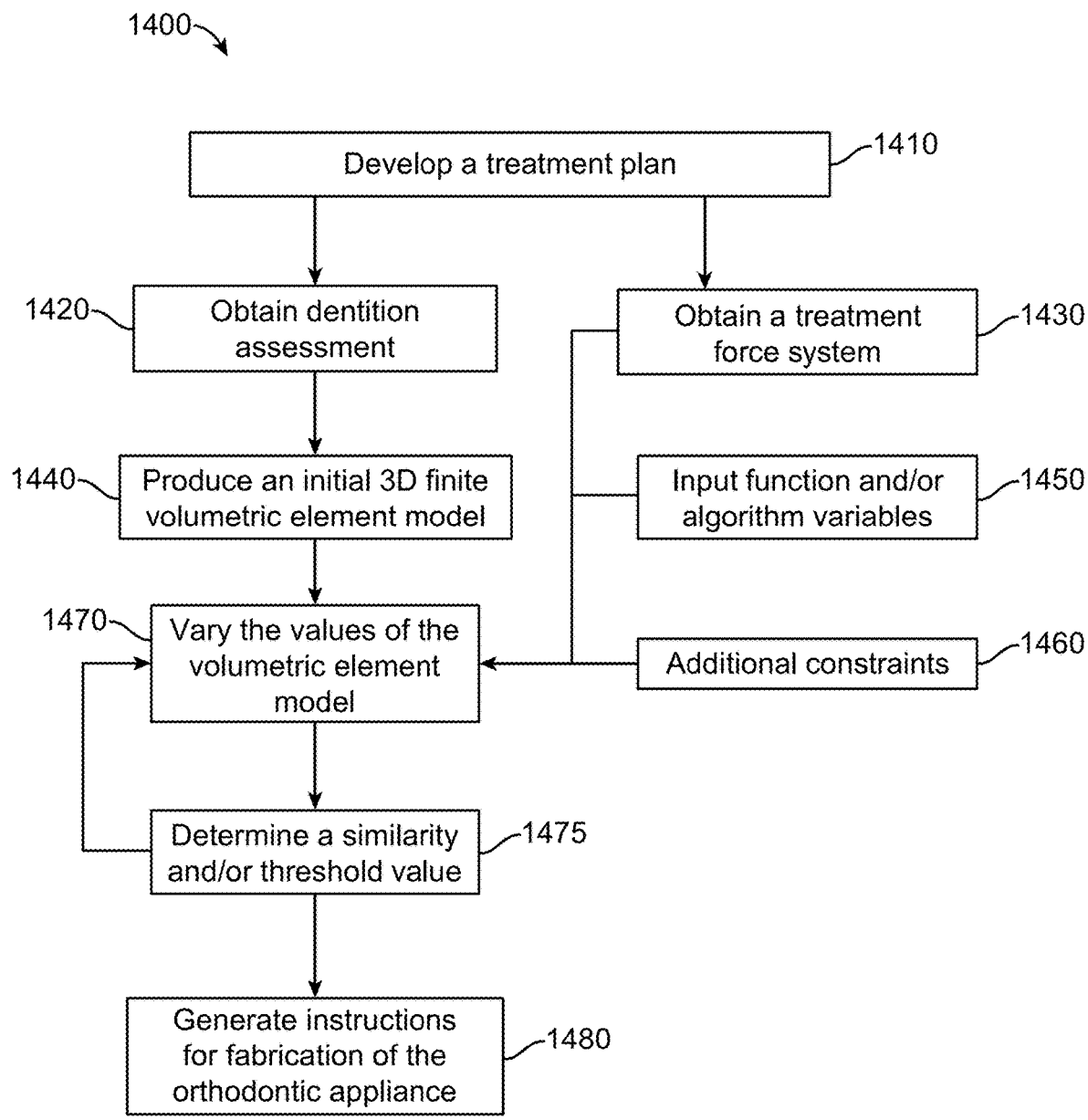
FIG. 14 depicts a schematic for a method for determining the geometry of an orthodontic appliance using topological optimization and volumetric elements.

FIG. 14 depicts a schematic of method 1400 for determining the geometry of an orthodontic appliance using topological optimization. Method 1400 provides an example process for determining the geometry of an orthodontic appliance using an initial 3D model and a finite volumetric element model. At block 1410, a treatment plan is developed. At block 1420 a dentition assessment is obtained. At block 1420, a dentition assessment is obtained for each stage of the treatment plan. In some embodiments, the dentition assessment is used to produce a model of a patient's teeth, and at block 1440 an initial 3D model of an orthodontic appliance can be produced. Further at block 1440, a finite volumetric element model of the orthodontic appliance can be generated.

In some embodiments, block 1410 of FIG. 14 corresponds with and/or incorporates block 110 of FIG. 1. In some embodiments, block 1420 of FIG. 14 corresponds with and/or incorporates block 120 of FIG. 1. In some embodiments, block 1430 of FIG. 14 corresponds with and/or incorporates block 130 of FIG. 1. In some embodiments, block 1450 of FIG. 14 corresponds with and/or incorporates block 150 of FIG. 1. In some embodiments, block 1460 of FIG. 14 corresponds with and/or incorporates block 160 of FIG. 1. In some embodiments, block 1475 of FIG. 14 corresponds with and/or incorporates block 175 of FIG. 1. In some embodiments, block 1480 of FIG. 14 corresponds with and/or incorporates block 180 of FIG. 1.

In some embodiments of method 1400 at block 1470, the volumetric element model from block 1440 can be varied by providing changes to the volumetric elements. Topological optimization can begin with a homogenous material and can be optimized by varying the properties at each element. In some embodiments, the model at block 1440 has a homogenous thickness. In certain embodiments at block 1470, volumetric elements are modified from one location to another, thereby forming a non-homogenous model. In some embodiments of block 1470, an element analysis platform is used to analyze the modeled force system. In certain embodiments, at least one volumetric element is modified, such as with a different density. In some embodiments, at least one volumetric element is randomly modified. In some embodiments of block 1470, the resulting intermediate 3D model (also referred to herein as the "intermediate 3D model") takes the varied finite volumetric element model as an input, determines the force on at least one tooth, and compares that to a corresponding treatment force from block 1430.

In some embodiments at block 1470, the force system applied by the variations of the finite volumetric element model is then compared at block 1475 with the therapeutic force of block 1430. In some embodiments, the comparison provides a score, and the score or plurality of scores can be used to determine whether the force system can achieve the therapeutic goal. As a non-limiting example, an intermediate 3D model at block 1470 can have a force system (also referred to as an "intermediate force system" or a "second modeled force") that is more similar to the therapeutic force system at block 1430 than that provided by the initial 3D model at block 1440. In some embodiments at block 1475, a similarity value is determined, comparing the modeled force system to the therapeutic force system. In certain embodiments, a scorer is determined.

In some embodiments at block 1470, variation to the finite volumetric element model imparts a force system which is then compared with the therapeutic force of block 1430, and the accuracy of the force system of at least one tooth is determined at block 1475. As a non-limiting example, a finite volumetric element model that imparts a force system which is identical to the force system at a tooth can be considered to be 100% accurate, with regards to said tooth. In some embodiments, the accuracy of the force system of a single tooth is determined. In some embodiments, the accuracy of the force system of a plurality of teeth is determined. In some embodiments, the accuracy of the entire treatment force system is determined.

In some embodiments at block 1475, variation of the finite volumetric element model provides a materials score, which corresponds to the amount of material used to fabricate a corresponding orthodontic appliance. In some embodiments, the materials score has a value between 0 and 1, which is scaled to an actual value of mass.

In some embodiments of block 1475, multiple comparisons can be used in the development of the orthodontic appliance. As a non-limiting example, variation to the values of the finite volumetric element model can result in the formation of more than one model that provides greater than 99% similarity to the treatment force system, but each model having different materials scores; thus an orthodontic appliance can be created having a similar force system while using a decreased amount of material.

At block 1470 of method 1400, finite volumetric element analysis can be conducted to determine how much variation can be done until a desired orthodontic appliance is represented. For example, a topological optimization can be represented at block 1440, and variations to the volumetric elements can produce an intermediate force system in block 1470 that is then evaluated at block 1475 for similarity to the desired therapeutic force system of block 1430. Based on the output of this intermediate force system at block 1470, a calculation can be done to decide which volumetric element to next vary, or whether a random perturbation should be attempted. The calculations and comparisons at block 1475 to intermediate 3D models and intermediate force systems of block 1470 can be repeated until a threshold score, similarity value, material score, or any combination thereof is obtained.

In some embodiments of block 1470, at least one discrete finite volumetric element is varied. In certain embodiments, the entire finite volumetric element model from block 1440 is varied at block 1470. As a non-limiting example, a finite element shell model having a uniform thickness map can be varied, generating an intermediate 3D model that has a non-uniform thickness map. In some embodiments, an algorithm is used to vary a thickness map.

The varied volumetric element model at block 1470 can provide a second modeled force, which can be compared at block 1475 with the first modeled force (i.e., the modeled force based on the initial finite volumetric element model at block 1440). In some embodiments of block 1470, varying at least one volumetric element of the finite volumetric element model generates at least one intermediate 3D model, the intermediate 3D model comprising the second modeled force to move the patient's teeth toward the final position. In certain embodiments, the second modeled force from block 1470 is more similar to the treatment force of block 1430 than the first modeled force from block 1440.

In certain embodiments of block 1470, the at least one volumetric element of the finite volumetric element model from block 1440 is varied using an algorithm, and optionally using software. In some embodiments, the finite volumetric element model of a thickness map can be varied using gradient-based methods, and/or secant methods. In some embodiments, the finite volumetric element model of a thickness map can be varied using software known in the art, such as Artelys Knitro, MATLAB Optimization Toolbox, and pyOpt platforms. In some embodiments, the finite volumetric element model of a topological density map can be varied using a method of moving asymptotes. In certain embodiments, the method of moving asymptotes comprises an iterative method for solving and/or approximating at least one value at block 1475 (e.g., a minimum material value required to generate an orthodontic appliance having at least 95% similarity to the treatment force system). In some embodiments, the method of moving asymptotes comprises an iterative process of generating a subproblem that is solved. In some embodiments, the method of moving asymptotes iteratively solves a function relating to the finite volumetric element model.

The modeled force of block 1470 can be varied with basis of an input function (e.g., the asymptote moving function) until a threshold value is realized at block 1475, until further iterations of the function do not generate a threshold variation at block 1475 (e.g., a convergence value is observed), or a combination thereof.

In some embodiments at block 1470, a finite volumetric element model can be varied using explicit time stepping methods. In certain embodiments of block 1470, the finite volumetric element model can be varied using additional constraints, as can be provided at block 1460. In an embodiment, a finite element shell model can be varied using a constrained search space. For example, the thickness map can be defined with a localized section comprising a tooth or a plurality of teeth in order to reduce the search space. Decreasing the size of the localized section can provide increased performance of calculations. Increasing the size of the localized section can provide a more accurate representation of, for example, the modeled forces of the finite element shell models.

In certain embodiments of block 1470, the finite volumetric element model can be varied using additional input functions or algorithms as can be provided at block 1450. In an embodiment, the techniques used to vary the finite volumetric element model can use a sensitivity-based algorithm. For example, to maximize strength of an orthodontic appliance (e.g., in situations where accurate forces and/or accurate moments are not the primary objective), the method can be optimized such that no gradient is used. By varying the method in this manner, a reduction of calculation time can be realized.

Discrete Thickness Map

In certain embodiments of block 140, the initial 3D model comprises a finite element shell model produced having a discrete thickness map defined by a sizing algorithm. In some embodiments of block 150, the input function used to vary the discrete thickness map comprises a sizing algorithm. The discrete thickness map can be varied by altering the parameters of the sizing algorithm, thus generating an intermediate 3D model of the orthodontic device at block 170.

In some embodiments of block 150, a discrete thickness map can use an algorithm to vary the value of at least one of the shell elements from block 170. In some embodiments, a sizing algorithm provided by block 150 is used in block 170 to vary a discrete thickness map. In some embodiments, the discrete thickness map is uniform, and the variation of value to the shell elements is applied to all of the shell elements. In other embodiments, the discrete thickness map is not uniform following variation. In some embodiments, each individual shell element has a value from 0 to 1. In some embodiments, each individual shell element has a value between 0 and 1. In certain embodiments, none of the individual shell elements has a value of 0.

In some embodiments at block 170, the discrete element thickness map defined by the topological function is varied, generating an intermediate 3D model of the orthodontic device. The discrete element thickness map can be varied by altering the sizing function, thus generating an intermediate 3D model of the orthodontic device. The intermediate 3D model of the orthodontic device at block 140 has a second modeled force.

At block 175, a comparison can be made between the first modeled force of block 130, the second modeled force of block 170, the treatment force as provided by the treatment plan of block 110, or any combination thereof.

Optionally, the finite element shell model at block 140 is varied in multiple iterations, further transforming the discrete element density map defined by the sizing function. The varying can end, as non-limiting examples, when further iterations do not provide a benefit to decreasing the size of the 3D model of the aligner, and/or when a threshold value is met, such as a value of similarity between the first modeled force, the second modeled force, the treatment force, or any combination thereof.

In some embodiments, the discrete thickness map is used with a sizing optimization model, wherein shells representing a thickness parameter are optimized. In some embodiments, the sizing optimization model can adjust shell values during optimization. In some embodiments, the sizing optimization model uses random perturbations on thickness values of shells, which can apply artificial aberrations, and optimization can occur therefrom.

Figure 15:
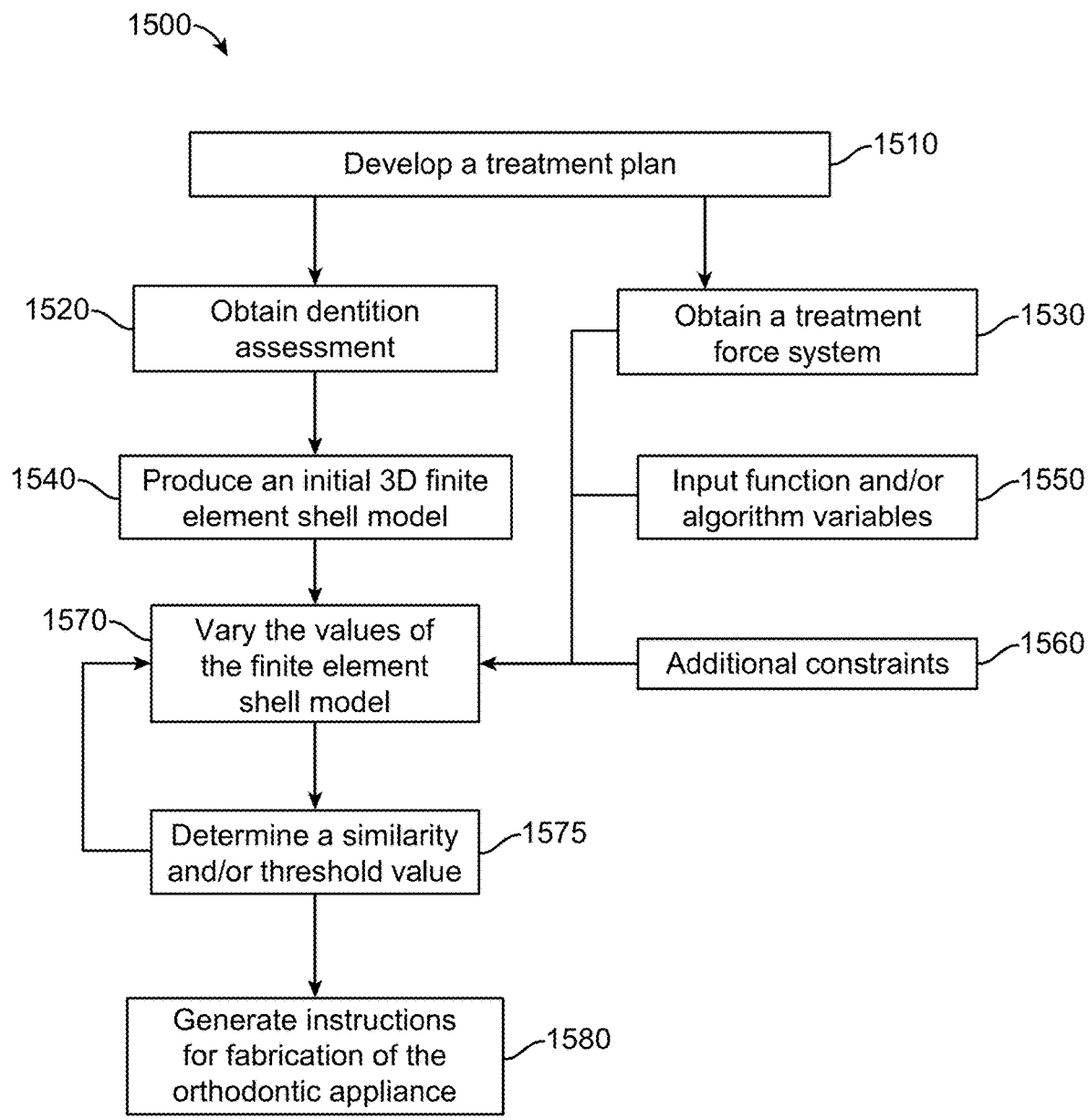
FIG. 15 depicts a schematic for a method for determining the geometry of an orthodontic appliance using sizing optimization and shell or beam elements.

FIG. 15 depicts a schematic of method 1500 for determining the geometry of an orthodontic appliance using sizing optimization. Method 1500 provides an example process for determining the geometry of an orthodontic appliance using an initial 3D model and a finite shell element model, wherein the shells represent a thickness parameter. At block 1510, a treatment plan is developed. At block 1520 a dentition assessment is obtained. At block 1520, a dentition assessment is obtained for each stage of the treatment plan. In some embodiments, the dentition assessment is used to produce a model of a patient's teeth, and at block 1540 an initial 3D model of an orthodontic appliance can be produced. Further at block 1540, a finite volumetric element model of the orthodontic appliance can be generated.

In some embodiments, block 1510 of FIG. 15 corresponds with and/or incorporates block 110 of FIG. 1. In some embodiments, block 1520 of FIG. 15 corresponds with and/or incorporates block 120 of FIG. 1. In some embodiments, block 1530 of FIG. 15 corresponds with and/or incorporates block 130 of FIG. 1. In some embodiments, block 1550 of FIG. 15 corresponds with and/or incorporates block 150 of FIG. 1. In some embodiments, block 1560 of FIG. 15 corresponds with and/or incorporates block 160 of FIG. 1. In some embodiments, block 1575 of FIG. 15 corresponds with and/or incorporates block 175 of FIG. 1. In some embodiments, block 1580 of FIG. 15 corresponds with and/or incorporates block 180 of FIG. 1.

In some embodiments, method 1500 discloses shell elements. In some embodiments, beam elements can be used to replace shell elements. In certain embodiments, beam elements take the place of shell elements throughout method 1500.

In some embodiments of method 1500 at block 1570, the shell element model from block 1540 can be varied by providing changes to the thickness value of the shells. Sizing optimization can begin with a homogenous representation of thickness and can be optimized by changing values of thickness. In preferred embodiments, varying the values of the finite element shell model retains a constant total thickness value. In some embodiments, the model at block 1540 has a shell model wherein the shells have homogeneous thickness values (i.e., are the same). In certain embodiments at block 1570, shell element values are moved from one location to another, thereby forming a non-homogenous model. In some embodiments of block 1570, an element analysis platform is used to analyze the modeled force system. In certain embodiments, at least one shell element value is varied. In some embodiments, at least one shell element value is randomly varied. In some embodiments of block 1570, the resulting intermediate 3D mesh model (also referred to herein as the "intermediate 3D model") takes the varied finite shell element model as an input, determines the force on at least one tooth, and compares that to a corresponding treatment force from block 1530.

In some embodiments at block 1570, variation to the finite volumetric element model imparts a force system which is then compared at block 1575 with the therapeutic force of block 1530. In some embodiments, the comparison provides a score, and the score or plurality of scores can be used to determine whether the force system can achieve the therapeutic goal. As a non-limiting example, an intermediate 3D model at block 1570 can have a force system (also referred to as an "intermediate force system" or a "second modeled force") that is more similar to the therapeutic force system at block 1530 than that provided by the initial 3D model at block 1540. In some embodiments at block 1575, a similarity value is determined, comparing the modeled force system to the therapeutic force system. In certain embodiments, a scorer is determined.

In some embodiments at block 1570, variation to the finite volumetric element model imparts a force system which is then compared with the therapeutic force of block 1530, and the accuracy of the force system of at least one tooth is determined at block 1575. As a non-limiting example, a finite shell element model that imparts a force system which is identical to the force system at a tooth can be considered to be 100% accurate, with regards to said tooth. In some embodiments, the accuracy of the force system of a single tooth is determined. In some embodiments, the accuracy of the force system of a plurality of teeth is determined. In some embodiments, the accuracy of the entire treatment force system is determined.

In some embodiments at block 1575, variation of the finite shell element model provides a materials score, which corresponds to the amount of material used to fabricate a corresponding orthodontic appliance. In some embodiments, the materials score has a value between 0 and 1, which is scaled to an actual value of mass.

In some embodiments of block 1575, multiple comparisons can be used in the development of the orthodontic appliance. As a non-limiting example, variation to the values of the finite shell element model can result in the formation of more than one model that provides greater than 99% similarity to the treatment force system, but each model having different materials scores; thus an orthodontic appliance can be created having a similar force system while using a decreased amount of material.

At block 1570 of method 1500, finite shell element analysis can be conducted to determine how much variation can be done until a desired orthodontic appliance is represented. For example, a sizing optimization can be represented at block 1540, and variations to the shell elements can produce an intermediate force system in block 1570 that is then evaluated at block 1575 for similarity to the desired therapeutic force system of block 1530. Based on the output of this intermediate force system at block 1570, a calculation can be made to determine which shell element to next vary, or whether a random perturbation should be attempted. The calculations and comparisons at block 1575 to intermediate 3D models and intermediate force systems of block 1570 can be repeated until a threshold score, similarity value, material score, or any combination thereof is obtained.

In some embodiments of block 1570, at least one discrete finite shell element is varied. In certain embodiments, the entire finite shell element model from block 1540 is varied at block 1570. As a non-limiting example, a finite element shell model having a uniform thickness parameter can be varied, generating an intermediate 3D model that has a non-uniform thickness map. In some embodiments, an algorithm is used to vary a non-parametric thickness map.

The varied shell element model at block 1570 can provide a second modeled force, which can be compared at block 1575 with the first modeled force (i.e., the modeled force based on the initial finite volumetric element model at block 1540). In some embodiments of block 1570, varying at least one volumetric element of the finite volumetric element model generates at least one intermediate 3D model, the intermediate 3D model comprising the second modeled force to move the patient's teeth toward the final position. In certain embodiments, the second modeled force from block 1570 is more similar to the treatment force of block 1530 than the first modeled force from block 1540.

In certain embodiments of block 1570, the at least one shell element of the finite shell element model from block 1540 is varied using an algorithm, and optionally using software. In some embodiments, the finite shell element model of a non-parametric thickness map can be varied using gradient-based methods, and/or secant methods. In some embodiments, the finite shell element model of a non-parametric thickness map can be varied using software known in the art, such as Artelys Knitro, MATLAB Optimization Toolbox, and pyOpt platforms. In some embodiments, the finite shell element model of a non-parametric thickness map can be varied using a method of moving asymptotes. In certain embodiments, the method of moving asymptotes comprises an iterative method for solving and/or approximating at least one value at block 1575 (e.g., a minimum material value to generate an orthodontic appliance having at least 95% similarity to the treatment force system). In some embodiments, the method of moving asymptotes comprises an iterative process of generating a subproblem that is solved. In some embodiments, the method of moving asymptotes iteratively solves a function relating to the finite shell element model.

The modeled force of block 1570 can be varied with basis of an input function (e.g., the asymptote moving function) until a threshold value is realized at block 1575, until further iterations of the function do not generate a threshold variation at block 1575 (e.g., a convergence value is observed), or a combination thereof.

In some embodiments at block 1570, a finite shell element model can be varied using explicit time stepping methods. In certain embodiments of block 1570, the finite shell element model can be varied using additional constraints, as can be provided at block 1560. In an embodiment, a finite element shell model can be varied using a constrained search space. For example, the non-parametric thickness map can be defined with a localized section comprising a tooth or a plurality of teeth in order to reduce the search space. Decreasing the size of the localized section can provide increased performance of calculations. Increasing the size of the localized section can provide a more accurate representation of, for example, the modeled forces of the finite element shell models.

In certain embodiments of block 1570, the finite shell element model can be varied using additional input functions or algorithms as can be provided at block 1550. In an embodiment, the techniques used to vary the finite shell element model can use a sensitivity-based algorithm. For example, to maximize strength of an orthodontic appliance (e.g., in situations where accurate forces and/or accurate moments are not the primary objective), the method can be optimized such that no gradient is used. By varying the method in this manner, a reduction of calculation time can be realized.

Completion of Variation

In some embodiments, at least one of the shell elements of the intermediate 3D model is varied, thus generating a second intermediate 3D model of the orthodontic device having a third modeled force. In some embodiments, the intermediate 3D shell model has at least one shell element that is varied, and the resulting third modeled force is compared with the first modeled force, the second modeled force, and/or the treatment force.

In certain embodiments, at least one of the first modeled force, the second modeled force, the third modeled force, and the therapeutic force is compared with any one of the first modeled force, the second modeled force, the third modeled force, and the therapeutic force in order to determine if further variation is required. For example, some embodiments of method 100 provide for a similarity comparison at block 175, wherein the first modeled force, the second modeled force, the third modeled force, and the therapeutic force according to the treatment plan are compared until a value or parameter has been met. In some embodiments, the finite element shell model is varied until a threshold similarity value is obtained. In some embodiments, the finite element shell model is varied until a threshold score is obtained. In certain embodiments, the finite element shell model is varied until no improvement is observed in the score and/or the similarity value.

In some embodiments, at least one of the first modeled force, the second modeled force, and the third modeled force is compared with the treatment force to provide the similarity value (e.g., at block 175). In some embodiments, the similarity value is a percentage match to the treatment force. For example, a first modeled force, a second modeled force, or both the first modeled force and the second modeled force can have greater than 50% similarity to the treatment force, greater than 60% similarity to the treatment force, greater than 70% similarity to the treatment force, greater than 80% similarity to the treatment force, greater than 90% similarity to the treatment force, greater than 91% similarity to the treatment force, greater than 92% similarity to the treatment force, greater than 93% similarity to the treatment force, greater than 94% similarity to the treatment force, greater than 95% similarity to the treatment force, greater than 96% similarity to the treatment force, greater than 97% similarity to the treatment force, greater than 98% similarity to the treatment force, or greater than 99% similarity to the treatment force.

In certain embodiments, the finite shell model is varied until the threshold similarity value is obtained (e.g., at block 175). In some embodiments, the threshold similarity value is when the first modeled force, the second modeled force, the third modeled force, or any combination thereof have greater than 50% similarity to the treatment force, greater than 60% similarity to the treatment force, greater than 70% similarity to the treatment force, greater than 80% similarity to the treatment force, greater than 90% similarity to the treatment force, greater than 91% similarity to the treatment force, greater than 92% similarity to the treatment force, greater than 93% similarity to the treatment force, greater than 94% similarity to the treatment force, greater than 95% similarity to the treatment force, greater than 96% similarity to the treatment force, greater than 97% similarity to the treatment force, greater than 98% similarity to the treatment force, or greater than 99% similarity to the treatment force.

In some embodiments, the finite shell model is varied until a threshold score value is obtained (e.g., at block 175).

In certain embodiments, the finite shell model is varied until a threshold shell element value is obtained (e.g., at block 175). The shell element value can be a minimum value of the map. For example, for a parametric thickness map, the threshold shell element value can be selected such that the thickness does not reach zero at any point in the aligner, thus preventing the development of an aligner with undesired holes. In some embodiments, the threshold shell element value is a size of the thickness of the orthodontic appliance. In some embodiments, the threshold shell element value is less than 1 mm, less than 900 µm, less than 800 µm, less than 700 µm, less than 600 µm, less than 500 µm, less than 400 µm, less than 300 µm, less than 200 µm, less than 100 µm, or less than 50 µm.

In some embodiments, the finite shell model is directionally varied in order to increase the similarity with each iteration of intermediate 3D models (e.g., at block 175). In certain embodiments, the finite shell model is varied until no further improvement is obtained with further variations (e.g., a high value for the similarity is reached). Using an intermediate finite element shell model that provides a desired similarity value or score, an orthodontic appliance can be fabricated.

Using the methods disclosed herein, the geometry of an orthodontic appliance can be determined with a decreased calculation time in comparison to traditional solid orthodontic appliance model calculations. In some embodiments, the method of determining the geometry of an orthodontic appliance provides a greater than 40%, a greater than 45%, a greater than 50%, a greater than 55%, a greater than 60%, a greater than 65%, a greater than 70%, a greater than 75%, a greater than 80%, a greater than 85%, a greater than 90%, or a greater than 95% reduction in calculation time when compared to a traditional solid orthodontic appliance model.

In some embodiments, the 3D model of the orthodontic appliance is an idealized model that can ignore properties. In certain embodiments, the idealized can ignore material properties, imperfections in manufacture, density gradients, thickness gradients, changes in the shell elements of the finite element shell model, and the like.

Additional Processes

In some embodiments, when a threshold shell element value, a score, a threshold similarity value, or a combination thereof is obtained (e.g., at block 175), a final model is generated (e.g., at block 180). The final model is a 3D model of the orthodontic appliance having a desired force system substantially similar to the treatment force. Further modifications can be made to the final model. As a non-limiting example, a final model providing a desired force system can be further modified to provide aesthetically pleasing features. Instructions for fabrication can be generated at block 180.

In some embodiments, a fabricated product is created based on the final model as provided by block 180. The various embodiments of the orthodontic appliances can be fabricated in a wide variety of ways. In some embodiments, the orthodontic appliances herein (or portions thereof) can be produced using direct fabrication, such as additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry.

In some embodiments, the orthodontic appliances herein can be fabricated using a combination of direct and indirect fabrication techniques, such that different portions of an appliance can be fabricated using different fabrication techniques and assembled in order to form the final appliance. For example, an appliance shell can be formed by indirect fabrication (e.g., thermoforming), and one or more structures or components as described herein (e.g., auxiliary components, power arms, etc.) can be added to the shell by direct fabrication (e.g., printing onto the shell).

The configuration of the orthodontic appliances herein can be determined according to a treatment plan for a patient as described using the methods above. Computer-based treatment planning and/or appliance manufacturing methods can be used in order to facilitate the design and fabrication of appliances. For instance, one or more of the appliance components described herein can have a geometry digitally determined and fabricated with the aid of computer-controlled manufacturing devices (e.g., computer numerical control (CNC) milling, computer-controlled additive manufacturing such as 3D printing, etc.). The computer-based methods presented herein can improve the accuracy, flexibility, and convenience of appliance fabrication.

In some embodiments, computer-based 3D planning/design tools, such as Treat™ software from Align Technology, Inc., can be used to design and fabricate the orthodontic appliances described herein.

Instructions for fabrication of the orthodontic appliance can be generated (e.g., at block 180). The instructions can be configured to control a fabrication system or device in order to produce the orthodontic appliance with desired appliance geometry and material composition. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.). Optionally, the instructions can be configured to cause a fabrication machine to directly fabricate the orthodontic appliance with teeth receiving cavities having variable gable bends. In alternative embodiments, the instructions can be configured for indirect fabrication of the appliance, e.g., by thermoforming. Any suitable fabrication system or device can be used in the fabrication of the orthodontic appliances described herein.

Using the methods disclosed herein, an orthodontic appliance can be constructed using less material when compared to a comparable traditional orthodontic appliance having the same therapeutic force system. The orthodontic appliance fabricated following the methods disclosed herein can use less than 5 g of material, less than 4.5 g of material, less than 4 g of material, less than 3.5 g of material, less than 3 g of material, less than 2.5 g of material, less than 2 g of material, less than 1.5 g of material, less than 1.4 g of material, less than 1.3 g of material, less than 1.2 g of material, less than 1.1 g of material, less than 1.0 g of material, less than 0.9 g of material, less than 0.8 g of material, less than 0.7 g of material, less than 0.6 g of material, less than 0.5 g of material, less than 0.4 g of material, less than 0.3 g of material, less than 0.2 g of material, or less than 0.1 g of material.

Figure 3A:
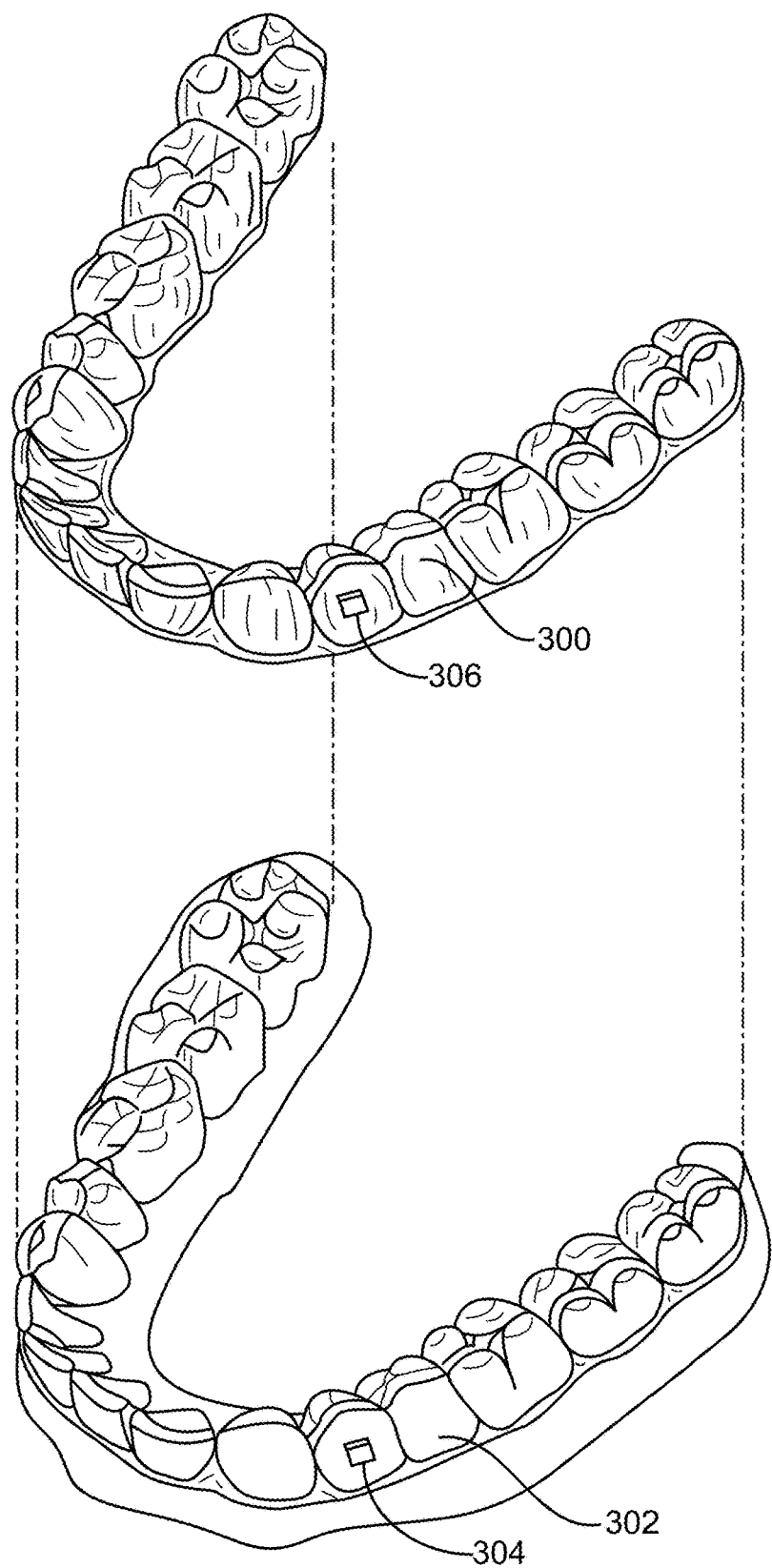
FIG. 3A depicts a tooth repositioning appliance that can be made using the methods disclosed herein.

FIG. 3A illustrates an exemplary tooth repositioning appliance or aligner 300 that can be made using the methods disclosed herein, and can be worn by a patient in order to achieve an incremental repositioning of individual teeth 302 in the jaw. The appliance can include a shell (e.g., a continuous polymeric shell or a segmented shell) having teeth-receiving cavities that receive and resiliently reposition the teeth. An appliance or portion(s) thereof can be indirectly fabricated using a physical model of teeth. For example, an appliance (e.g., polymeric appliance) can be formed using a physical model of teeth and a sheet of suitable layers of polymeric material. The physical model (e.g., physical mold) of teeth can be formed through a variety of techniques, including 3D printing. The appliance can be formed by thermoforming the appliance over the physical model. In some embodiments, a physical appliance is directly fabricated, e.g., using additive manufacturing techniques, from a digital model of an appliance. In some embodiments, the physical appliance can be created through a variety of direct formation techniques, such as 3D printing. An appliance can fit over all teeth present in an upper or lower jaw, or less than all of the teeth. The appliance can be constructed to accommodate the teeth of the patient (e.g., the topography of the tooth-receiving cavities matches the topography of the patient's teeth), and can be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. In some embodiments, no wires or other means will be provided for holding an appliance in place over the teeth. In some cases, however, it may be desirable or necessary to provide individual attachments or other anchoring elements 304 on teeth 302 with corresponding receptacles or apertures 306 in the appliance 300 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Optionally, in cases involving more complex movements or treatment plans, it may be beneficial to utilize auxiliary components (e.g., features, accessories, structures, devices, components, and the like) in conjunction with an orthodontic appliance. Examples of such accessories include but are not limited to elastics, wires, springs, bars, arch expanders, palatal expanders, twin blocks, occlusal blocks, bite ramps, mandibular advancement splints, bite plates, pontics, hooks, brackets, headgear tubes, springs, bumper tubes, palatal bars, frameworks, pin-and-tube apparatuses, buccal shields, buccinator bows, wire shields, lingual flanges and pads, lip pads or bumpers, protrusions, divots, and the like. In some embodiments, the appliances, systems and methods described herein include improved orthodontic appliances with integrally formed features that are shaped to couple to such auxiliary components, or that replace such auxiliary components.

FIG. 3B illustrates a tooth repositioning system 310 including a plurality of appliances 312, 314, 316. Any of the orthodontic appliances described herein can be designed and/or provided as part of a set of a plurality of appliances used in a tooth repositioning system. Each appliance can be configured so a tooth-receiving cavity has a geometry corresponding to an intermediate or final tooth arrangement intended for the appliance. The patient's teeth can be progressively repositioned from an initial tooth arrangement towards a target tooth arrangement by placing a series of incremental position adjustment appliances over the patient's teeth. For example, the tooth repositioning system 310 can include a first appliance 312 corresponding to an initial tooth arrangement, one or more intermediate appliances 314 corresponding to one or more intermediate arrangements, and a final appliance 316 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which can include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 4:
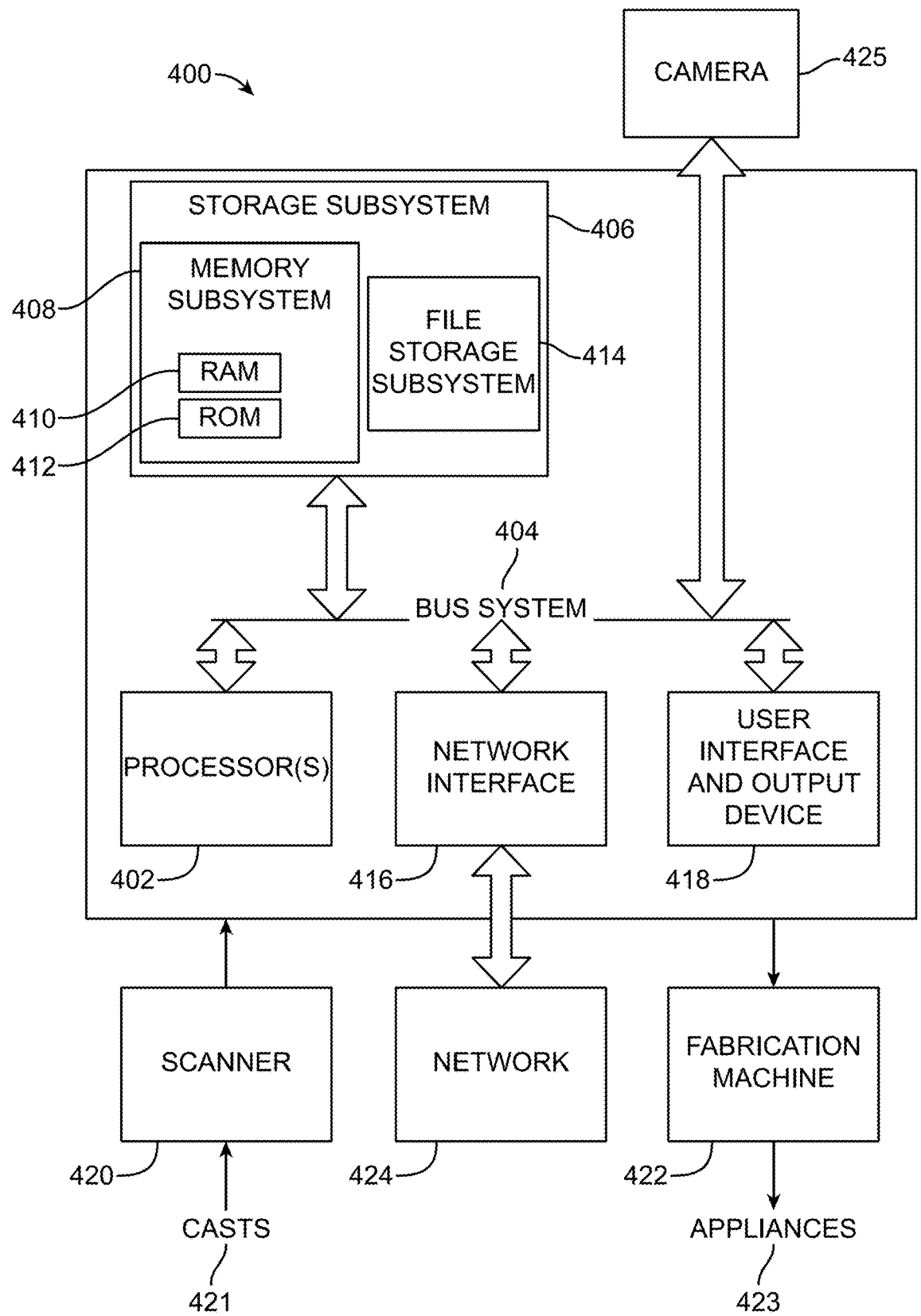
FIG. 4 depicts a data processing system that can be used in executing methods and processes described herein.

A data processing system (FIG. 4) can be used in executing methods and processes described herein. The data processing system 400 typically includes at least one processor 402 that communicates with one or more peripheral devices via bus subsystem 404. These peripheral devices typically include a storage subsystem 406 (memory subsystem 408 and file storage subsystem 414), a set of user interface input and output devices 418, and an interface to outside networks 416. This interface is shown schematically as "Network Interface" block 416, and is coupled to corresponding interface devices in other data processing systems via communication network interface 424. Data processing system 400 can include, for example, one or more computers, such as a personal computer, workstation, mainframe, laptop, and the like.

The user interface input devices 418 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 406 maintains the basic required programming, including computer readable media having instructions (e.g., operating instructions, etc.), and data constructs. The program modules discussed herein are typically stored in storage subsystem 406. Storage subsystem 406 typically includes memory subsystem 408 and file storage subsystem 414. Memory subsystem 408 typically includes a number of memories (e.g., RAM 410, ROM 412, etc.) including computer readable memory for storage of fixed instructions, instructions and data during program execution, basic input/output system, etc. File storage subsystem 414 provides persistent (non-volatile) storage for program and data files, and can include one or more removable or fixed drives or media, hard disk, floppy disk, CD-ROM, DVD, optical drives, and the like. One or more of the storage systems, drives, etc., can be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 420 includes any means for obtaining a digital representation (e.g., images, surface topography data, etc.) of a patient's teeth (e.g., by scanning physical models of the teeth such as casts 421, by scanning impressions taken of the teeth, or by directly scanning the intraoral cavity), which can be obtained either from the patient or from treating professional, such as an orthodontist, and includes means of providing the digital representation to data processing system 400 for further processing. Scanner 420 can be located at a location remote with respect to other components of the system and can communicate image data and/or information to data processing system 400, for example, via a network interface 424. Fabrication system 422 fabricates appliances 423 based on a treatment plan, including data set information received from data processing system 400. Fabrication machine 422 can, for example, be located at a remote location and receive data set information from data processing system 400 via network interface 424. The camera 425 can include any image capture device configured to capture still images or movies. The camera 425 can facilitate capturing various perspectives of a patient's dentition. In some implementations, the camera 425 can facilitate capture of images at various focal lengths and distances from the patient.

The data processing aspects of the methods described herein can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing blocks can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor will receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

Designing a Dental Appliance

Figure 5:
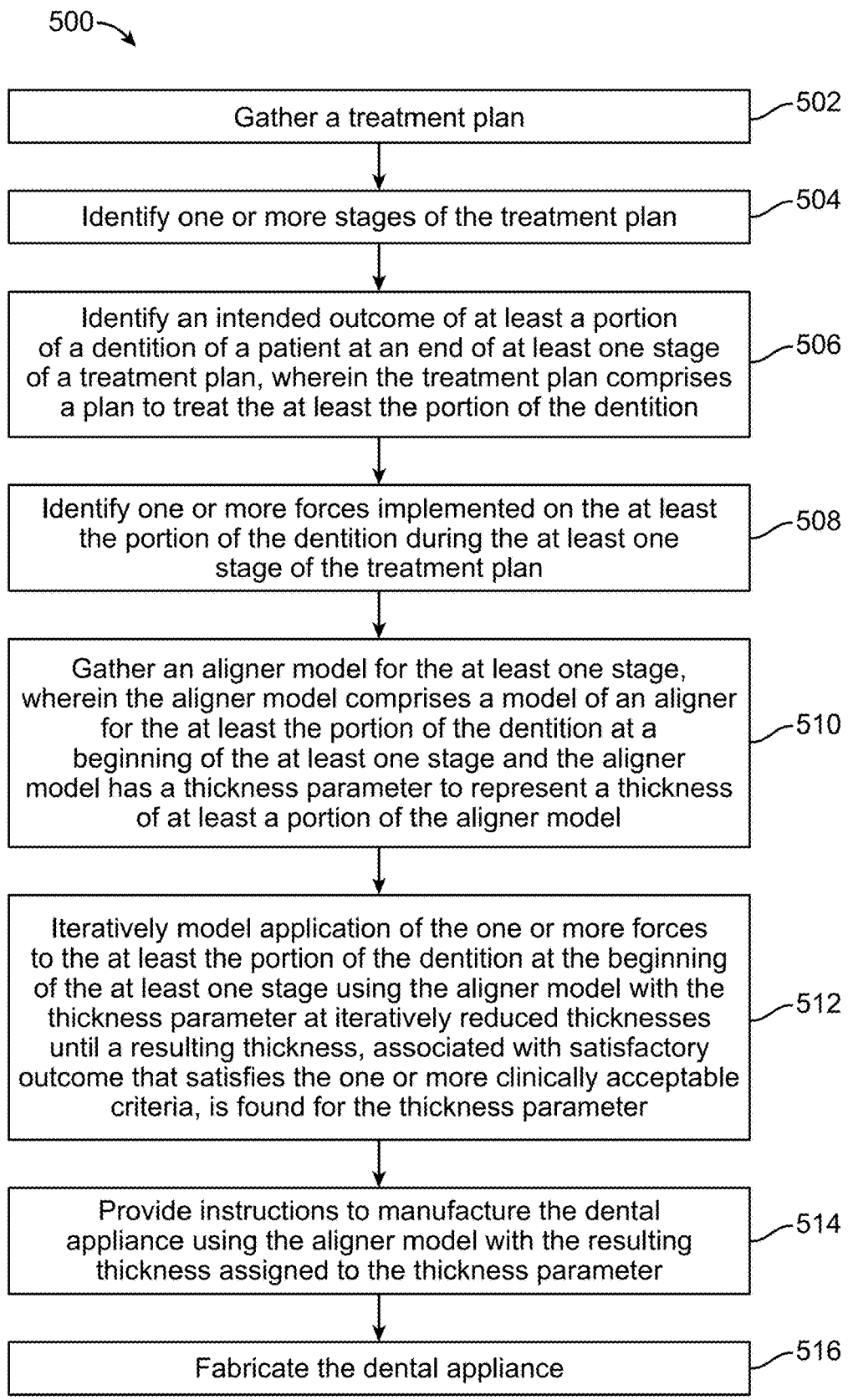
FIG. 5 shows an example flowchart of a method for designing a dental appliance, according to some embodiments.

FIG. 5 depicts a schematic of method 500 for designing a dental appliance, according to some of the embodiments disclosed herein. Method 500 provides an example process for designing a dental appliance using iteratively modeled aligner models with iteratively reduced thicknesses. At block 502, a treatment plan is gathered. As disclosed in method 100, the treatment plan can comprise a plurality of stages to move a patient's teeth from an initial position towards a final position. A dentition assessment can be obtained, and a desired force system can be arranged based on the patient's dentition. At block 504 of method 500, one or more stages of the treatment plan is identified. In some embodiments, the treatment plan is developed having a desired therapeutic force system that can directionally induce programmed movements of the patient's teeth. In some embodiments, the treatment plan comprises a desired therapeutic force system that can directionally induce programmed movements of at least a portion of the patient's teeth.

In some embodiments, a dentition assessment is obtained at the end of at least one stage of the treatment plan. At block 506 of method 500, an intended outcome of at least a portion of a dentition of the patient at an end of at least one stage of a treatment plan is identified. The intended outcome of the at least a portion of the dentition of the patient at the end of at least one stage of the treatment plan can be the final position of the patient's teeth at said stage, as discussed further at block 110 of method 100. At block 506, the treatment plan comprises a plan to treat the at least the portion of the dentition. In some embodiments, a plan to treat at least the portion of the dentition comprises the application of therapeutic treatment forces to said portion of the dentition. In some embodiments, the plan to treat at least the portion of the dentition comprises the application of forces to provide adjustment to the patient's teeth or dentition. At block 508, one or more forces implemented on the at least the portion of the dentition during the at least one stage of the treatment plan is identified. In some embodiments, at least one force implemented on at least a portion of the dentition during at least one stage of the treatment plan is identified. In some embodiments, a plurality of forces implemented on at least a portion of the dentition during at least one stage of the treatment plan is identified. In some embodiments, the at least a portion of the dentition comprises a portion of one or more teeth of the dentition and the at least the portion of the aligner is configured to receive and apply the one or more forces to the one or more teeth.

In some embodiments, the at least one stage of the treatment plan comprises an initial stage of the treatment plan. In some embodiments, the at least one stage of the treatment plan comprises a final stage of the treatment plan. In some embodiments, the at least one stage of the treatment plan comprises an intermediate stage of the treatment plan. In some embodiments, the at least one stage of the treatment plan comprises a plurality of stages of the treatment plan. In some embodiments, the at least one stage comprises at least one of an initial stage of the treatment plan, a final stage of the treatment plan, an intermediate stage of the treatment plan, a plurality of stages of the treatment plan, or any combination thereof.

In some embodiments, at least one criterion for clinical acceptability is identified for at least one stage of the treatment plan. In some embodiments, a plurality of criteria for clinical acceptability is identified for at least one stage of the treatment plan. The clinical acceptability criteria provide criteria to evaluate compliance with the intended outcome. In certain embodiments, one or more clinical acceptability criteria for at least one stage of the treatment plan are identified, and the one or more clinical acceptability criteria provide criteria to evaluate compliance with the intended outcome. Some non-limiting examples of criteria to evaluate compliance with the intended outcome are provided above in the discussion regarding threshold score, similarity value, material score, or any combination thereof. In some embodiments, the one or more clinical acceptability criteria comprise a clinical acceptability score representing a likelihood of statistical correlation with the intended outcome. In some embodiments, the intended outcome corresponds with the treatment force system developed in the treatment plan. In some embodiments, the one or more clinical acceptability criteria indicate an acceptable biomechanical outcome for the end of the at least one stage of the treatment plan. In some embodiments, the one or more clinical acceptability criteria indicate an acceptable biomechanical outcome for the end of the treatment plan. In some embodiments, the acceptable biomechanical outcome comprises an acceptable position of the at least the portion of the dentition at the end of the at least one stage or an acceptable force on the at least the portion of the dentition during the at least one stage. In some embodiments, the acceptable biomechanical outcome comprises an acceptable position of the at least the portion of the dentition at the end of the at least one stage, the acceptable force on the at least the portion of the dentition at the end of the at least one stage, or any combination thereof. In some embodiments, the one or more clinical acceptability criteria indicate an acceptable physiological stress on the at least the portion of the dentition during the at least one stage. In some embodiments, said acceptable physiological stress corresponds with at least one force determined in the treatment force system of block 130 of method 100. In some embodiments, the one or more clinical acceptability criteria indicate an acceptable aligner structural property for a device implementing the at least one stage of the treatment plan. In some embodiments, the acceptable aligner structural property for the dental appliance comprises a variable thickness aligner having a resulting thickness over the at least the portion of the dentition. The resulting thickness is further defined below.

An aligner model can be generated as further disclosed herein. At block 510 of method 500, an aligner model for at least one stage is gathered. The aligner model comprises a model of the aligner for at least a portion of the dentition at the beginning of at least one stage. The aligner model has a thickness parameter to represent the thickness of at least a portion of the aligner model. As disclosed above, a thickness parameter of an aligner model may represent an intended thickness of a physical aligner corresponding to the aligner model. For variable thickness aligners, one or more thickness parameters may represent thicknesses of various regions of a physical aligner, including but not limited to areas around specific teeth and/or portions of a dentition. In some embodiments, the modeling application of the one or more forces to the at least the portion of the dentition at the beginning of the at least one stage of the treatment plan comprises simulating placement of the aligner model on the at least the portion of the dentition and simulating a response of the at least the portion of the dentition to a virtual placement (i.e., the simulated placement).

The application of the one or more forces to the at least a portion of the dentition at the beginning of the at least one stage using the aligner model with the thickness parameter is iteratively modeled at block 512. In some embodiments, the iterative models have iteratively reduced thicknesses. In some embodiments, the application of at least one force to at least the portion of the dentition at the beginning of the at least one stage using the aligner model with the thickness parameter is modeled with iteratively reduced thicknesses of at least a portion of the aligner model. The iterative reduction of thickness can continue until a resulting thickness is found that has a satisfactory outcome that satisfies the one or more clinically acceptable criteria for the thickness parameter. In some embodiments, iteratively modeling application of the one or more forces to the at least the portion of the dentition comprises using finite element techniques to solve partial differential equations representing the one or more clinical acceptability criteria. Such finite element techniques are provided further herein (e.g., the use of a finite element shell model). A satisfactory outcome may be, for example, the attainment of the threshold score, similarity value, material score, or any combination thereof in the aligner model of the at least one stage. The resulting thickness has a thickness parameter, the resulting thickness being less than or equal to the starting thickness of the aligner model. The resulting thickness is associated with a satisfactory outcome of the at least the portion of the dentition at the end of the at least one stage of the treatment plan, the satisfactory outcome satisfying the one or more clinical acceptability criteria.

At block 514 of method 500, instructions to manufacture the dental appliance using the aligner model with the resulting thickness assigned to the thickness parameter are provided. At block 516, the dental appliance is fabricated. The aligner model with the resulting thickness assigned to the thickness parameter is used. Further disclosure relating to the instructions and manufacture of the dental appliance are provided herein (as a non-limiting example, see discussion relating to 180 of method 100, above). In some embodiments, the dental appliance is directly fabricated. In some embodiments, the method comprises directly fabricating said dental appliance.

In some embodiments, the dental appliance comprises a polymeric aligner configured to receive the dentition of the patient and to implement the one or more forces thereon. Further discussion relating to the polymeric aligner is provided herein (see, e.g., discussion of FIG. 3A, above).

Figure 6:
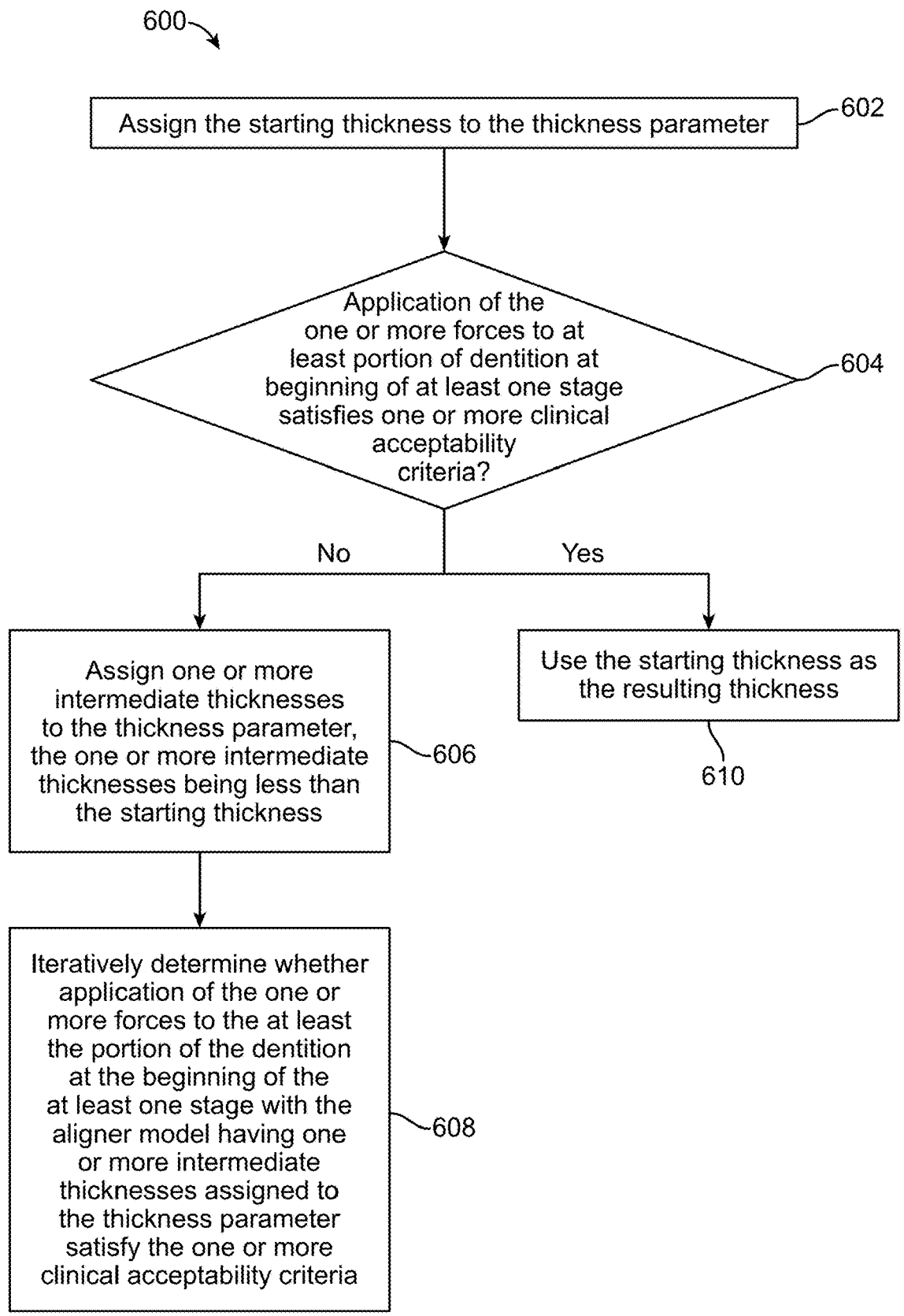
FIG. 6 shows an example flowchart of a method for iteratively modeling application of forces to a dentition to obtain an aligner model with a resulting thickness, according to some embodiments.

An example of a method for iteratively modeling the application of forces to a dentition to obtain an aligner model is provided at FIG. 6. At block 602 of method 600, iteratively modeling the application of one or more forces to the at least the portion of the dentition at the beginning of the at least one stage of the treatment plan comprises assigning a starting thickness to the thickness parameter. In some embodiments, iteratively modeling the application of the one or more forces to the at least the portion of the dentition at the beginning of the at least one stage comprises simulating placement of the aligner model on the at least the portion of the dentition and simulating a response of the at least the portion of the dentition to the virtual placement. At block 604, it is determined whether the application of the one or more forces to at least the portion of the dentition at the beginning of at least one stage of the treatment plan satisfies one or more clinical acceptability criteria.

In some embodiments, the starting thickness comprises one or more of 0.5 millimeters (mm), 0.6 mm, 0.7 mm, 0.8 mm, 0.9 mm, 1.0 mm, 1.1 mm, 1.2 mm, 1.3 mm, 1.4 mm, and 1.5 mm. In some embodiments, the starting thickness is less than 1.5 mm, less than 1.4 mm, less than 1.3 mm, less than 1.2 mm, less than 1.1 mm, less than 1.0 mm, less than 0.9 mm, less than 0.8 mm, less than 0.7 mm, less than 0.6 mm, or less than 0.5 mm. In some embodiments, the starting thickness is greater than 0.1 mm and less than 2.5 mm, greater than 0.2 mm and less than 2.0 mm, greater than 0.3 mm and less than 1.8 mm, greater than 0.4 mm and less than 1.6 mm, or greater than 0.5 mm and less than 1.5 mm. In some embodiments, the starting thickness is between 0.1 mm and 2.5 mm, between 0.2 mm and 2.0 mm, between 0.3 mm and 1.8 mm, between 0.4 mm and 1.6 mm, or between 0.5 mm and 1.5 mm.

If the determination at block 604 is affirmative (i.e., the starting thickness satisfies one or more clinical acceptability criteria), the starting thickness is used as the resulting thickness assigned to the thickness parameter of the aligner model. At block 610 of method 600, if the application of one or more forces to the at least the portion of the dentition at the beginning of the at least one stage with the aligner model having the starting thickness assigned to the thickness parameter satisfies the one or more clinical acceptability criteria, the starting thickness is used as the resulting thickness. As a non-limiting example, if a starting thickness provides forces that are within the threshold of a force similarity value (as disclosed further herein) for a stage of the therapeutic treatment plan, said starting thickness can be used as the resulting thickness assigned to the thickness parameter of the aligner model.

If the determination at block 604 is negative (i.e., application of the one or more forces to at least a portion of the dentition at the beginning of at least one stage does not satisfy one or more clinical acceptability criteria), then one or more intermediate thicknesses are assigned to the thickness parameter. At block 606 of method 600, one or more intermediate thicknesses are assigned to the thickness parameter. The one or more intermediate thicknesses are less than the starting thickness (i.e., the thickness parameter decreases). At block 608, it is iteratively determined whether application of the one or more forces to the at least the portion of the dentition at the beginning of the at least one stage with the aligner model having one or more intermediate thicknesses assigned to the thickness parameter satisfy the one or more clinical acceptability criteria. In some embodiments, the iterative determination is continued until an intermediate thickness is provided that satisfies one or more clinical acceptability criteria. In some embodiments, the iterative determination is continued until all iterations of each variable have been attempted. In some embodiments, if the application of the one or more forces to the at least the portion of the dentition at the beginning of the at least one stage of the treatment plan with the aligner model having one or more intermediate thicknesses assigned to the thickness parameter satisfies the one or more clinical acceptability criteria, the one or more intermediate thicknesses are used as the resulting thickness. In some embodiments, the one or more intermediate thicknesses of block 608 of method 600 are used as the resulting thickness of block 512 of method 500.

Figure 7:
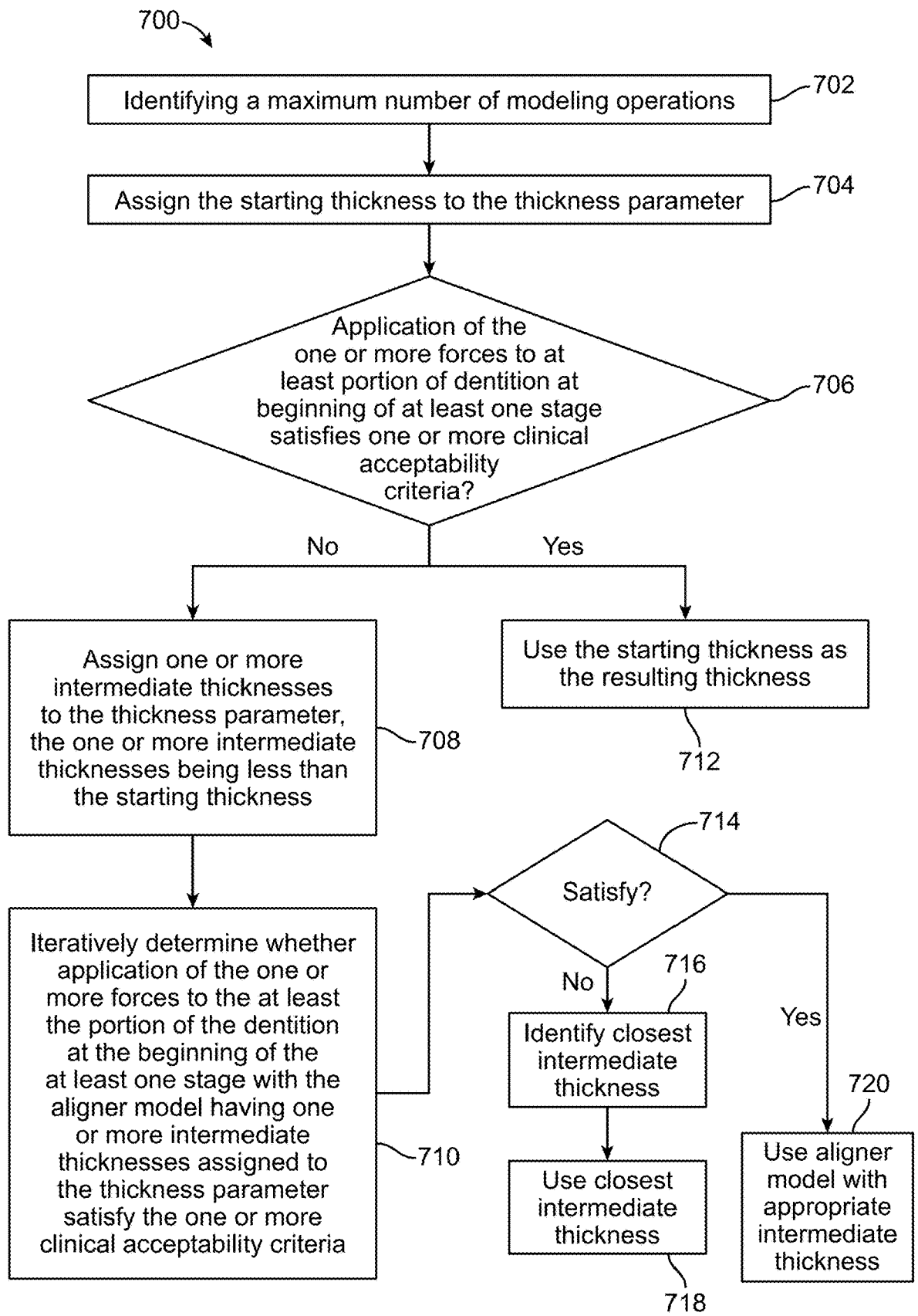
FIG. 7 shows an example flowchart of a method for iteratively modeling application of forces to a dentition to obtain an aligner model with a resulting thickness, according to some embodiments.

In some embodiments, a maximum number of modeling operations are established prior to the iterative modeling. An example of a method having a maximum number of modeling operations is provided at FIG. 7. At block 702 of method 700, a maximum number of modeling operations are identified. In some embodiments, the maximum number of modeling operations is less than 100, less 1,000, less than 10,000, less than 100,000, less than 1 million, less than 2 million, less than 3 million, less than 4 million, less than 5 million, or less than 10 million modeling operations.

At block 704 of method 700, iteratively modeling the application of one or more forces to the at least the portion of the dentition at the beginning of the at least one stage of the treatment plan comprises assigning a starting thickness to the thickness parameter. At block 706, it is determined whether the application of the one or more forces to at least the portion of the dentition at the beginning of at least one stage of the treatment plan satisfies one or more clinical acceptability criteria.

If the determination at block 706 is affirmative (i.e., the starting thickness satisfies one or more clinical acceptability criteria), the starting thickness is used as the resulting thickness assigned to the thickness parameter of the aligner model. At block 712 of method 700, if the application of one or more forces to the at least the portion of the dentition at the beginning of the at least one stage with the aligner model having the starting thickness assigned to the thickness parameter satisfies the one or more clinical acceptability criteria, the starting thickness is used as the resulting thickness. As a non-limiting example, if a starting thickness provides forces that are within the threshold of a force similarity value (as disclosed further herein) for a stage of the therapeutic treatment plan, said starting thickness can be used as the resulting thickness assigned to the thickness parameter of the aligner model.

If the determination at block 706 is negative (i.e., application of the one or more forces to at least a portion of the dentition at the beginning of at least one stage does not satisfy one or more clinical acceptability criteria), then one or more intermediate thicknesses are assigned to the thickness parameter. At block 708 of method 700, one or more intermediate thicknesses are assigned to the thickness parameter. The one or more intermediate thicknesses are less than the starting thickness (i.e., the thickness parameter decreases). At block 710, it is iteratively determined whether application of the one or more forces to the at least the portion of the dentition at the beginning of the at least one stage with the aligner model having one or more intermediate thicknesses assigned to the thickness parameter satisfy the one or more clinical acceptability criteria. The number of iterations is capped by the identified maximum number of modeling operations. At block 714, it is determined whether the clinical acceptability criteria has been met within the maximum number of modeling operations from block 702.

If the determination at block 714 is affirmative (i.e., one or more intermediate thicknesses satisfies the one or more clinical acceptability criteria) then at block 720 an aligner model with the one or more intermediate thicknesses is used as the resulting thickness of block 512. As a non-limiting example, if an intermediate thickness provides forces that are within the threshold of a force similarity value (as disclosed further herein) for a stage of the therapeutic treatment plan, said intermediate thickness can be used as the resulting thickness assigned to the thickness parameter of the aligner model.

If the determination at block 714 is negative (i.e., no intermediate thickness satisfies the one or more clinical acceptability criteria) and the maximum number of modeling operations has been met, then the closest intermediate thickness is identified at block 716. In some embodiments, the closest intermediate thickness of the one or more intermediate thicknesses is identified, and the aligner model with the closest intermediate thickness being closer to satisfying the one or more clinical acceptability criteria than aligner models having the starting thickness or any of the one or more intermediate thicknesses other than the closest intermediate thickness. As a non-limiting example, if modeling operations are conducted with a similarity threshold having 95% similarity to a treatment force system, and after the maximum number of modeling operations the closest similarity value observed amongst all intermediate thicknesses is 94% similarity to the treatment force system, then said intermediate thickness parameter providing a model with 94% similarity to the treatment force system will be used as the resulting thickness. At block 718 of method 700, the closest intermediate thickness identified from block 716 is used as the resulting thickness of block 512 of method 500.

In some embodiments, the method of designing a dental appliance further comprises the steps of gathering the treatment plan, and identifying at least one stage of the treatment plan.

EXAMPLES

Example 1

Parametric Model for Orthodontic Appliance for Arch Expansion with Missing Tooth An orthodontic appliance providing arch expansion force was designed using a parametric thickness map. This model could be used to account for a missing tooth.

Providing arch expansion force for a region with a missing tooth is challenging because of the lack of anchorage due to the missing contact between an orthodontic appliance and teeth. A traditionally-designed aligner may not provide sufficient expansion force to move, for example, a molar in a distal direction when a neighboring tooth is missing. A parametric thickness map was used to locally and iteratively increase the wall thickness of the aligner for a patient with a missing tooth, and an increase of force for arch expansion was observed. As shown in FIG. 11A-D, the arch expansion force was increased from approximately 0.5 N to approximately 1.2 N with variation to the thickness map. FIG. 11A shows a first model wherein the thickness map provided a corresponding force for arch expansion of 0.67 N; FIG. 11B shows a second model wherein the thickness map provided a corresponding force for arch expansion of 1.02 N; FIG. 11C shows a third model wherein the thickness map provided a corresponding force for arch expansion of 0.76 N; FIG. 11D shows a fourth model wherein the thickness map provided a corresponding force for arch expansion of 1.18 N. By providing an optimized and increased force, a substantially similar level of arch expansion force is provided in the model having the missing tooth as compared with a model without the missing tooth.

Example 2

Model for Correcting Anterior Teeth Overjet

An orthodontic appliance is be modeled to correct anterior teeth (e.g., upper anterior teeth) that overjet.

Figure 13A:
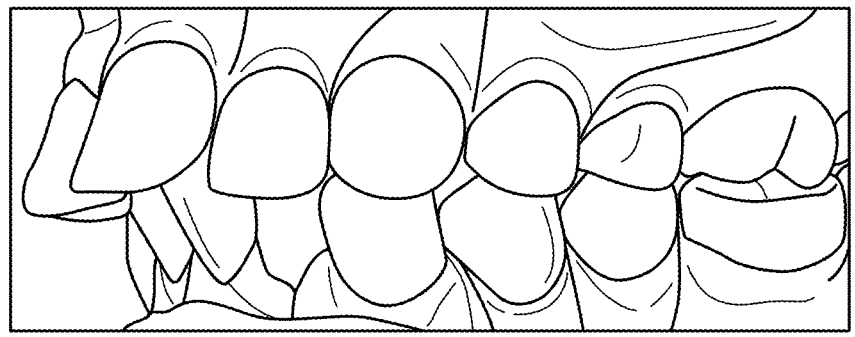
FIG. 13A shows an example of upper anterior teeth overjet.

To correct upper anterior teeth overjet (FIG. 13A), a treatment plan is developed to retract and upright upper anterior teeth. The orthodontic appliance is designed to provide an active force and moment to pull the teeth lingually and rotate the teeth lingually. The procedure includes: (i) determining which teeth need to be retroclined (usually but not necessarily anterior teeth); (ii) calculating the center of root (COR) positions for each tooth; (iii) simulating the force system of the orthodontic appliance and extracting the force and moment data on the COR points; and (iv) starting with a thick appliance geometry, a topology optimization is run on the orthodontic appliance, during which material on the exterior surfaces (non-tooth facing surfaces) of the orthodontic appliance can selectively be removed and the geometry is optimized with a design goal to maximize the moment on the COR toward the lingual direction while constraining the force on COR to the lingual direction. The procedure can also, or alternatively, use a shell model using shells that comprise a thickness parameter.

Example 3

Model for Controlling Mesial-Distal Root Tipping

An orthodontic appliance is be modeled to control mesial-distal root movement.

Figure 13B:
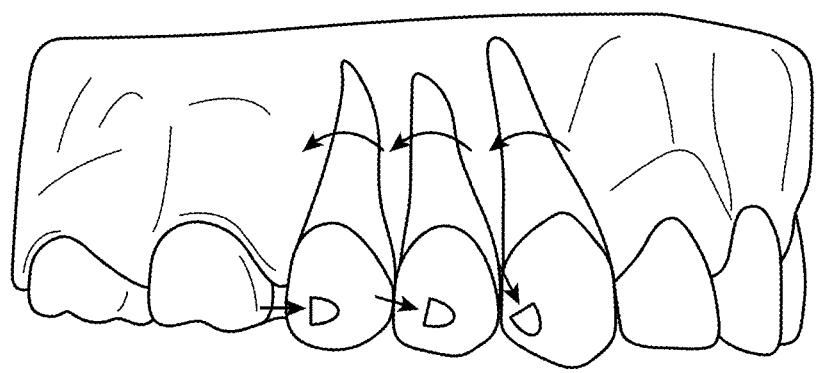
FIG. 13B shows an example of mesial-distal tooth movement.

Canines and premolars can be moved in a mesial-distal direction to close gaps (FIG. 13B). Traditionally, a translational force is applied to the crown. Improved treatment is provided by also providing a moment to the teeth to avoid root tipping. During model optimization, a simulated force and moment from the modeled orthodontic appliance can be used to reduce root tipping moment on the crown. An input function at 150 and/or constraint at 160 from FIG. 1 can maximize the anti-tipping moment on the crown of the teeth while designing the orthodontic appliance using a constrained amount of material.

Example 4

Model for Controlling Lingual Root Torque

An orthodontic appliance is be modeled to control lingual root torque.

Figure 13C:
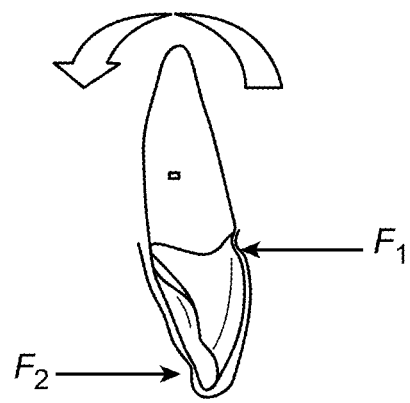
FIG. 13C shows an example of application of forces to control root tipping.

Teeth can be moved in a lingual direction, but tipping may occur (FIG. 13C). Improved treatment is provided by applying a moment to the crown of the teeth to be moved. Using a model disclosed herein, an orthodontic appliance is designed with control on root torque. In the model, an input function and/or constraint is provided to control the tipping moment. The input function and/or constraint can include a bubble-like feature (a power ridge feature) that is designed to control tipping moment. Further constraint on the displacement on the aligner to be smaller than a threshold value can be introduced to avoid flaring issues with the orthodontic appliance.

Teeth programmed to move towards a lingual direction can be modeled and tipping avoided with the application of moment on the crown of the modeled tooth. Power ridge features (e.g., bubble-like features) are placed to control the tipping moment. During optimization, constraints are introduced defining how the power ridge feature can be modified during the optimization process. Containment of displacement on the orthodontic appliance to below a threshold value facilitates the production of orthodontic appliances without flaring issues following optimization of geometry.

Example 5

Model for Unidirectional Movement of Multiple Teeth

An orthodontic appliance is be modeled to provide unidirectional movement to multiple teeth.

When multiple consecutive teeth are moved in the same direction (e.g., during multiple-tooth intrusion, proclination, or expansion) using some traditional orthodontic appliances, a loss of force is observed with some teeth, resulting in decreased efficacy of the orthodontic appliance. By modeling element thickness of an orthodontic appliance, optimization can be targeted toward providing sufficient force to move the teeth along the desired pathway.

A treatment plan includes the application of force for unidirectional movement of consecutive teeth, the desired intrusion force being applied from one canine tooth to the other (FIG. 12A). A model is generated of an orthodontic appliance providing optimized force for the intrusion of the consecutive teeth. The optimization target is set as maximizing the minimum force required in the moving direction. The modeling design region is limited in order to facilitate the speed and efficiency of calculations. The design region is set from first premolar to first premolar (FIG. 12B), and optimization is carried out with said design region to generate an optimized orthodontic appliance.

Example 6

Optimization of Shell Element Map

An orthodontic appliance is modeled with a shell element map representing thickness.

Sizing optimization can be used with a shell element map to optimize thickness of a modeled orthodontic appliance. Shell element modeling using the shell elements to represent thickness is faster than topological optimization of a solid element. This sizing optimization of the shell element map can used to optimize thickness distribution of an orthodontic appliance to provide therapeutic forces, such as tooth translation and rotation.

Figure 10A:
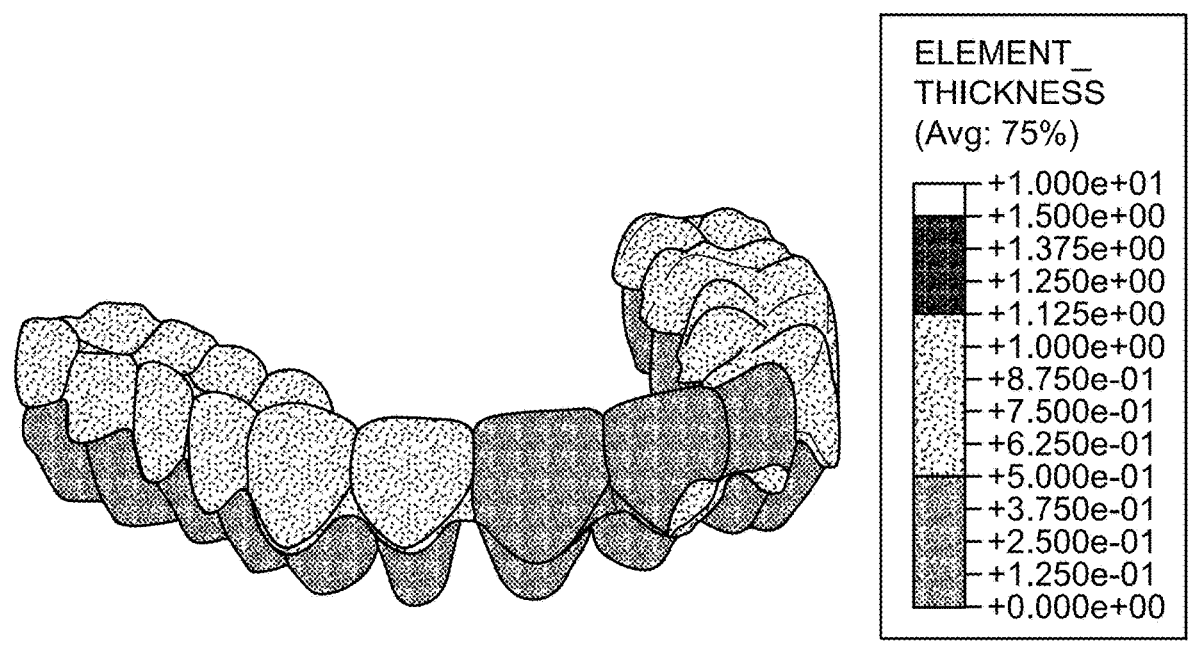
FIG. 10A shows an example shell element 3D model of an orthodontic appliance having element thickness modified to optimize tooth movement.
Figure 10B:
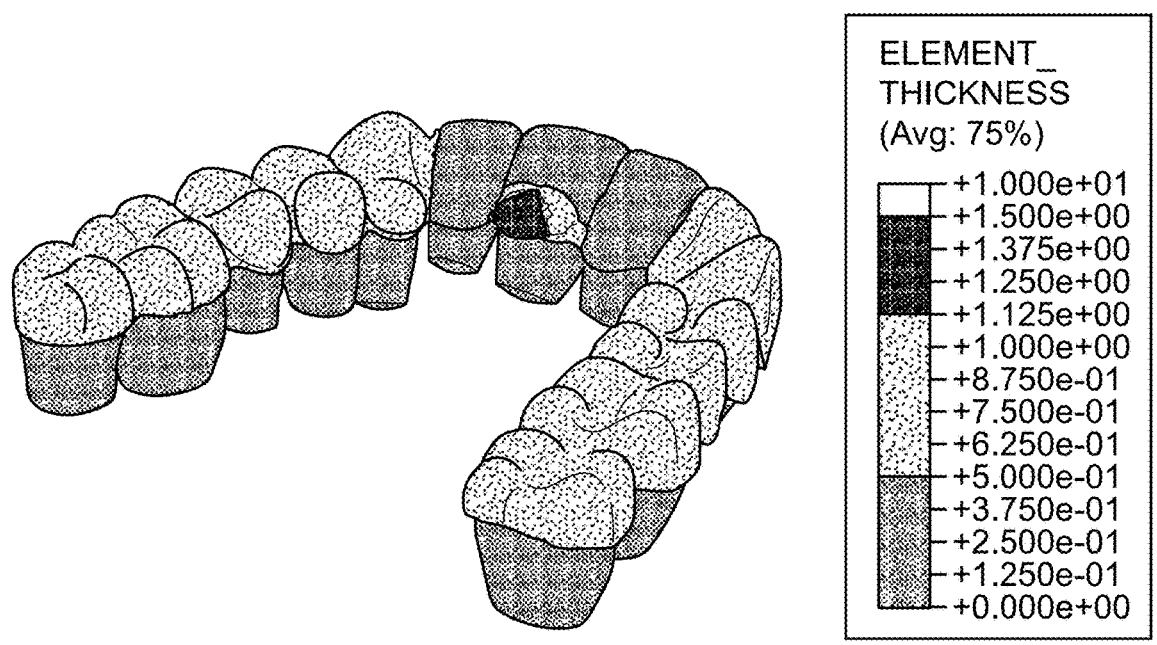
FIG. 10B shows an alternate view of the example shell element model.

An orthodontic appliance modeled using a shell element map, using shell elements to represent thickness, was optimized to provide therapeutic force with optimized thickness distribution (FIG. 10A (front of model), FIG. 10B (back of model)). The element thickness was modified to achieve forces for desired tooth movement. As shown by FIG. 10A and FIG. 10B, the resulting shell element map has a distribution of thickness that is not homogenous, and generates a model orthodontic appliance with optimized thickness to provide target forces for desired tooth movement. Topology, sizing, and bead optimizations can be applied.

Example 7

Topology Optimization of a Solid Element

Topology optimization was used to optimize an orthodontic appliance.

Topology optimization is a method of optimizing material layout within a given set of loads, boundary conditions, and constraints, with the goal of providing a defined performance, such as strength, displacement, rotation, and the like. An example of topological optimization was conducted on a single tooth to generate a localized section of an optimized orthodontic appliance (FIG. 8A-E).

As shown in FIG. 8A, a single canine tooth was modeled. This tooth was modeled using a shell element map. As shown in FIG. 8B, a localized section of an orthodontic appliance was modeled having an initial geometry to fit the modeled canine tooth. As shown in FIG. 8C, the modeled canine tooth was matched with the modeled section of the orthodontic appliance, and the modeled section of the orthodontic appliance was broken into volumetric elements. As shown in FIG. 8D, the modeled section of the orthodontic appliance was optimized to reduce tipping during movement of the tooth. The reduction of tipping was realized through optimization of the contour of the modeled section of the orthodontic appliance. As shown in FIG. 8E, an optimized orthodontic appliance was generated using the modeled section of said orthodontic appliance.

Figure 9D:
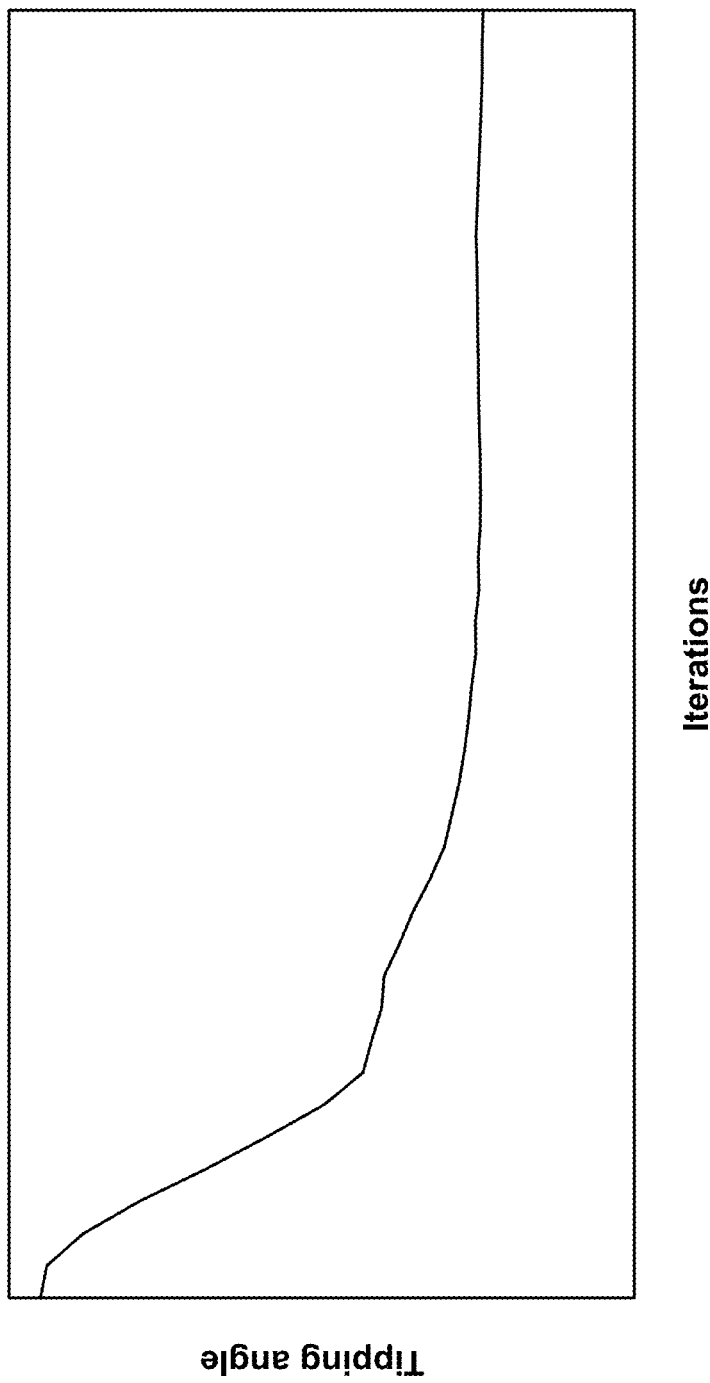
FIG. 9D shows an example minimization of tipping angle through iterations of modeling.

Numerous iterations of modeling were conducted to generate the optimized aligner of FIG. 8E. Example optimized contour models are shown in FIG. 9A-9C. FIG. 9A shows an early stage model of the modeled canine in the modeled region of the orthodontic appliance having a relatively high tipping angle; FIG. 9B shows an intermediate stage model wherein the modeled canine has a decreased tipping angle; FIG. 9C shows a late stage model wherein the modeled canine has a near-minimized tipping angle. FIG. 9D shows the tipping angle decreases with the number of iterations of models, leading toward a plateau.

In particular examples, direct fabrication is used to produce the optimized orthodontic appliance with varied thickness.

Example 8

Parameter Implementation into Model

Functional parameterization was used during the design of an orthodontic appliance. Using a model system or method described further herein, parameters can be incorporated into the formation of an orthodontic appliance to improve functionality.

A 3-dimensional tooth model is generated, the model having a thickness function (e.g., FIG. 2A-2C). The calculation of the thickness function incorporates parameters implemented into the tooth model. In certain embodiments, the parameter includes clinical features, such as the spatial arrangement, proximity, and orientation of nearby teeth and soft tissue relative to a point on the aligner model. The local thickness of a point can be calculated, said calculation incorporating the functional parameterization to provide a desirable effect. As a non-limiting example, functional parameterization is used to map clinical features (e.g., features to provide the force to move a tooth) on an orthodontic appliance surface in a manner that provides a smooth surface, which can improve patient experience with a device by accounting for proximity of soft tissue.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for designing an aligner, the method comprising:
    identifying an intended outcome of a dentition of a patient at an end of at least one stage of a treatment plan to treat the dentition;
    identifying one or more forces implemented on the dentition during the at least one stage of the treatment plan;
    identifying one or more clinical acceptability criteria for the at least one stage, the one or more clinical acceptability criteria providing criteria to evaluate compliance with the intended outcome;
generating an aligner model representing an aligner configured to be worn on the dentition during the at least one stage to treat the dentition;
providing a thickness map of the aligner model, wherein the thickness map comprises a thickness parameter for each location of the aligner model, and wherein each thickness parameter is initially set to a starting thickness;
reducing the value of each thickness parameter of the thickness map over a plurality of iterations until a resulting thickness is determined for each thickness parameter, wherein:
  the resulting thickness of each thickness parameter is less than the corresponding starting thickness of each thickness parameter,
  the resulting thickness is determined based on the one or more forces and a plurality of new models for the aligner model, wherein each new model is generated using a corresponding iteratively reduced thickness value for each iteration of the plurality of iterations, and
  the resulting thickness is associated with a satisfactory outcome of the dentition at the end of the at least one stage, the satisfactory outcome satisfying the one or more clinical acceptability criteria; and
providing instructions to manufacture the aligner using the aligner model with the resulting thickness determined for each thickness parameter of the thickness map.

2. The method of claim 1, wherein reducing the value of each thickness parameter of the thickness map over the plurality of iterations comprises:
  assigning an intermediate thickness less than the corresponding starting thickness to at least one thickness parameter;
  determining whether a new model generated using the intermediate thickness for the at least one thickness parameter satisfies the one or more clinical acceptability criteria; and
  if the new model generated using the intermediate thickness for the at least one thickness parameter satisfies the one or more clinical acceptability criteria, using the intermediate thickness as the resulting thickness for the at least one thickness parameter.

3. The method of claim 1, wherein reducing the value of each thickness parameter of the thickness map over the plurality of iterations comprises:
  assigning the corresponding starting thickness to each thickness parameter;
  determining whether the aligner model having the corresponding starting thickness for each thickness parameter satisfies the one or more clinical acceptability criteria; and
  if the aligner model does not satisfy the one or more clinical acceptability criteria:
    assigning one or more intermediate thicknesses to at least one thickness parameter, the one or more intermediate corresponding thicknesses being less than the corresponding starting thickness of the at least one thickness parameter; and
    iteratively determining whether a new model generated using the one or more intermediate thicknesses for the at least one thickness parameter satisfies the one or more clinical acceptability criteria.

4. The method of claim 3, further comprising: if the new model generated using the one or more intermediate thicknesses satisfies the one or more clinical acceptability criteria, using one of the one or more intermediate thicknesses as the resulting thickness for the at least one thickness parameter.

5. The method of claim 3, further comprising: using one of the one or more intermediate thicknesses as the resulting thickness for the at least one thickness parameter.

6. The method of claim 1, wherein reducing the value of each thickness parameter of the thickness map over the plurality of iterations comprises:
  identifying a maximum number of modeling operations;
  assigning the corresponding starting thickness to each thickness parameter;
  determining whether the aligner model having the corresponding starting thickness for each thickness parameter satisfies the one or more clinical acceptability criteria;
  if the aligner model having the corresponding starting thickness assigned to each thickness parameter does not satisfy the one or more clinical acceptability criteria:
    assigning one or more intermediate thicknesses to at least one thickness parameter, the one or more intermediate thicknesses being less than the corresponding starting thickness of the at least one thickness parameter; and
    iteratively determining whether a new model generated using the one or more intermediate thicknesses satisfies the one or more clinical acceptability criteria;
  the new model generated using the one or more intermediate thicknesses for the at least one thickness parameter does not satisfy the one or more clinical acceptability criteria:
    identifying a closest intermediate thickness of the one or more intermediate thicknesses, wherein a new model generated using the closest intermediate thickness for the at least one thickness parameter is closer to satisfying the one or more clinical acceptability criteria than other new models or the aligner model; and
    using the closest intermediate thickness as the resulting thickness for the at least one thickness parameter.

7. The method of claim 1, further comprising:
receiving the treatment plan; and
identifying the at least one stage of the treatment plan.

8. The method of claim 1, wherein each starting thickness comprises one or more of 0.5 millimeters (mm), 0.6 mm, 0.7 mm, 0.8 mm, 0.9 mm, 1.0 mm, 1.1 mm, 1.2 mm, 1.3 mm, 1.4 mm, or 1.5 mm.

9. The method of claim 1, wherein reducing the value of each thickness parameter of the thickness map over the plurality of iterations comprises simulating placement of the aligner model on the dentition and simulating a response of the dentition to the placement.

10. The method of claim 1, wherein reducing the value of each thickness parameter of the thickness map over the plurality of iterations comprises using a finite element technique to solve partial differential equations representing the one or more clinical acceptability criteria.

11. The method of claim 1, wherein the one or more clinical acceptability criteria comprise a clinical acceptability score representing a likelihood of statistical correlation with the intended outcome.

12. The method of claim 1, wherein the one or more clinical acceptability criteria indicate an acceptable biomechanical outcome for the end of the at least one stage.

13. The method of claim 12, wherein the acceptable biomechanical outcome comprises an acceptable position of the dentition at the end of the at least one stage or an acceptable force on the dentition during the at least one stage.

14. The method of claim 1, wherein the one or more clinical acceptability criteria indicate an acceptable physiological stress on the dentition during the at least one stage.

15. The method of claim 1, wherein the one or more clinical acceptability criteria indicate an acceptable structural property for the aligner.

16. The method of claim 1, wherein the aligner is configured to receive and apply the one or more forces to the dentition.

17. The method of claim 16, wherein the aligner has a variable thickness.

18. The method of claim 1, further comprising directly fabricating the aligner.

19. The method of claim 1, wherein the at least one stage comprises one or more of: an initial stage of the treatment plan, a final stage of the treatment plan, an intermediate stage of the treatment plan, or a plurality of stages of the treatment plan.

20. The method of claim 1, wherein the aligner comprises a polymeric shell configured to receive the dentition of the patient and to implement the one or more forces thereon.

21. The method of claim 1, wherein each new model has a topography matching a smoothed topography of the dentition.

22. The method of claim 1, wherein reducing the value of each thickness parameter of the thickness map over the plurality of iterations comprises:
(i) modeling forces of the aligner model having the corresponding starting thickness for each thickness parameter;
(ii) assessing whether the aligner model having the corresponding starting thickness for each thickness parameter satisfies the one or more clinical acceptability criteria;
(iii) when the aligner model having the corresponding starting thickness for each thickness parameter does not satisfy the one or more clinical acceptability criteria, reducing the corresponding starting thickness of at least one thickness parameter to a first intermediate thickness;
(iv) assessing whether a new model having the first intermediate thickness for the at least one thickness parameter satisfies the one or more clinical acceptability criteria;
(v) when the new model having the first intermediate thickness for the at least one thickness parameter does not satisfy the one or more clinical acceptability criteria, reducing the first intermediate thickness of the at least one thickness parameter to a second intermediate thickness; and
(vi) iteratively repeating steps (iv)-(v) until the resulting thickness is determined for the at least one thickness parameter.

* * * * *

UNITED STATES PATENT AND TRADEMARK OFFICE
CERTIFICATE OF CORRECTION

PATENT NO. : 11,666,415 B2
APPLICATION NO. : 16/732141
DATED : June 6, 2023
INVENTOR(S) : Yuxiang Wang et al.

It is certified that error appears in the above-identified patent and that said Letters Patent is hereby corrected as shown below:

In the Claims

In Column 44, in Claim 6, Line 30, delete "the new" and insert -- if the new --, therefor.

Signed and Sealed this
Eleventh Day of July, 2023

Katherine Kelly Vidal
*Director of the United States Patent and Trademark Office*